US011964313B2

(12) United States Patent
Gromes, Sr. et al.

(10) Patent No.: US 11,964,313 B2
(45) **Date of Patent: *Apr. 23, 2024**

(54) REACTION FORCE NOZZLE

(71) Applicant: Terydon, Inc., Navarre, OH (US)

(72) Inventors: Terry D. Gromes, Sr., Navarre, OH (US); Gary L. Manack, Jr., Navarre, OH (US); Kristen E. Griffin, Navarre, OH (US)

(73) Assignee: STONEAGE, INC., Durango, CO (US)

( * ) Notice: Subject to any disclaimer, the term of this patent is extended or adjusted under 35 U.S.C. 154(b) by 405 days.

This patent is subject to a terminal disclaimer.

(21) Appl. No.: 17/319,750

(22) Filed: May 13, 2021

(65) Prior Publication Data

US 2021/0283664 A1 Sep. 16, 2021

Related U.S. Application Data

(60) Division of application No. 16/810,949, filed on Mar. 6, 2020, now Pat. No. 11,040,381, which is a division of application No. 16/809,883, filed on Mar. 5, 2020, now Pat. No. 11,040,380, which is a continuation of application No. 16/248,354, filed on Jan. 15, 2019, now Pat. No. 10,618,084, which is a continuation-in-part of application No. 15/876,415, filed on Jan. 22, 2018, now Pat. No. 10,399,129.

(51) Int. Cl.

| | |
|---|---|
| ***B08B 9/032*** | (2006.01) |
| ***B05B 1/02*** | (2006.01) |
| ***B08B 3/02*** | (2006.01) |
| ***B08B 3/04*** | (2006.01) |
| ***B08B 9/043*** | (2006.01) |

(52) U.S. Cl.
CPC .............. *B08B 9/0321* (2013.01); *B05B 1/02* (2013.01); *B08B 3/02* (2013.01); *B08B 3/04* (2013.01); *B08B 9/0433* (2013.01); *B08B 2209/032* (2013.01)

(58) Field of Classification Search
CPC .... B05B 1/02; B05B 3/04; B05B 3/06; B08B 9/0321; B08B 9/0433; B08B 3/02; B08B 3/04; B08B 2209/032
USPC ...................... 239/251, 263; 134/168 C, 179
See application file for complete search history.

(56) References Cited

U.S. PATENT DOCUMENTS

| | | | |
|---|---|---|---|
| 3,876,154 | A | 4/1975 | Griebel |
| 4,531,250 | A | 7/1985 | Watanabe |
| 5,052,624 | A | 10/1991 | Boers et al. |
| 5,312,049 | A | 5/1994 | Bayler |

(Continued)

*Primary Examiner* — Steven J Ganey
(74) *Attorney, Agent, or Firm* — James H. Ortega; Stephen Y. Liu; Carstens, Allen & Gourley, LLP

(57) ABSTRACT

A nozzle for water jet equipment and a method of use thereof. The nozzle has a body including a base with a shaft extending outwardly therefrom. The shaft is inserted through a bore of a sleeve that rotatable about the shaft. The base and shaft define a bore therein. At least one opening is defined in the shaft and one or more grooves are milled into the shaft's exterior surface. Each opening places the body's bore in fluid communication with one of the grooves and the sleeve's bore. Water flowing through the body's bore will flow through each opening, into the associated groove and into a space between the shaft and sleeve. The shaft terminates in a conical section usable as a battering ram to break up blockages in pipes during cleaning operations.

20 Claims, 19 Drawing Sheets

(56) References Cited

U.S. PATENT DOCUMENTS

| | | | |
|---|---|---|---|
| 3,234,580 | A | 2/1996 | Keck |
| 5,840,315 | A | 11/1998 | Leigh |
| 5,865,876 | A | 2/1999 | Watkins et al. |
| 5,909,848 | A | 6/1999 | Zink |
| 5,964,414 | A | 10/1999 | Hardy et al. |
| 6,059,202 | A | 5/2000 | Zink et al. |
| 6,651,905 | B2 | 11/2003 | Sesser |
| 6,672,257 | B1 | 1/2004 | Ashton, III et al. |
| 6,840,315 | B2 * | 1/2005 | Jarchau ............... E21B 41/0078 239/251 |
| 7,380,731 | B1 | 6/2008 | Hsu |
| 11,052,437 | B2 * | 7/2021 | Gromes, Sr. .......... B05B 1/3436 |
| 2004/0050955 | A1 | 3/2004 | Sesser et al. |
| 2008/0142620 | A1 | 6/2008 | Scheidt et al. |
| 2011/0108636 | A1 * | 5/2011 | Wright .................. F16C 17/105 239/251 |
| 2014/0008459 | A1 * | 1/2014 | Wright .................. B05B 13/069 239/251 |
| 2015/0075573 | A1 | 3/2015 | Hirasaka et al. |
| 2019/0224724 | A1 | 7/2019 | Gromes, Sr. et al. |
| 2019/0224725 | A1 * | 7/2019 | Gromes, Sr. .......... B08B 9/0321 |
| 2020/0206790 | A1 * | 7/2020 | Gromes, Sr. .............. B08B 3/04 |

* cited by examiner

REACTION FORCE NOZZLE

CROSS REFERENCE TO RELATED APPLICATIONS

This is a Divisional application of U.S. patent application Ser. No. 16/810,949 filed Mar. 6, 2020, which is a Divisional application of U.S. patent application Ser. No. 16/248,354, now U.S. Pat. No. 10,618,084 filed Jan. 15, 2019, which is a Continuation-in-Part application of U.S. patent application Ser. No. 15/876,415, now U.S. Pat. No. 10,399,129 filed Jan. 22, 2018; the entire specifications of which are incorporated herein by reference.

TECHNICAL FIELD

This present disclosure relates to water jet equipment. More particularly the disclosure is directed to a nozzle for water jet equipment. Specifically, the disclosure relates to a nozzle for water jet equipment and a method of using the same; where the nozzle includes a body with a shaft and a sleeve that rotates about the shaft, and where the shaft has one or more grooves milled into the shaft's exterior surface; and where the grooves create turbulence in water that moves into a space between the shaft and the sleeve and slows leakage from the nozzle.

BACKGROUND INFORMATION

Heat exchangers are used to transfer heat from a solid object to a fluid or from one fluid to another fluid. The heat exchanger will include a plurality of elongate tubes that carry steam or water. Over time, solid materials tend to become deposited on the interior surfaces of these tubes and the solid materials may eventually become thick enough to clog the tubes.

It is therefore customary to clean the tubes from time to time. This cleaning is typically accomplished using a water jet to blast away the deposited solid materials. A lance or washer arm having a nozzle at one end is inserted into each tube and a water jet is sprayed out of the nozzle to blast away the clog or blockage.

The nozzles in question typically include a stationary part and a sleeve that rotates about this stationary part. The problem with this cleaning equipment is that because the water is delivered to the nozzle under extremely high pressure, there is a tendency for water to leak out of the top and bottom ends of the rotating sleeve. While the leaking water creates a water bearing that helps the sleeve to rotate, the rate of water leakage in PRIOR ART nozzles may be upwards of about eight gallons per minute. This leakage makes the nozzles far less efficient than desirable and also wastes a considerable amount of water.

The other issue with this cleaning equipment is that as the nozzle comes into contact with deposited material as those deposits are removed from the interior of the tube, some of the particulate materials can become trapped between the rotating sleeve and the stationary part of the nozzle and hinder or even stop the rotation of the sleeve. This can result in damage to the nozzle as water continues to be delivered under high pressure to the nozzle.

SUMMARY

There is therefore a need in the art for an improved nozzle that leaks to a lesser degree and which has a reduced tendency to become blocked. The nozzle disclosed herein addresses these shortcomings of the prior art.

A nozzle for water jet equipment and a method of use thereof is disclosed herein. The nozzle has a body including a base with a shaft extending outwardly therefrom. The shaft is inserted through a bore of a sleeve that rotatable about the shaft. The base and shaft define a bore therein. At least one opening is defined in the shaft and one or more grooves are milled into the shaft's exterior surface. Each opening places the body's bore in fluid communication with one of the grooves and the sleeve's bore. Water flowing through the body's bore will flow through each opening, into the associated groove and into a space between the shaft and sleeve. The grooves create turbulence in water in this space and thereby reduce leakage from the nozzle. The shaft terminates in a conical section usable as a battering ram to break up blockages in pipes during cleaning operations.

In one aspect, the present disclosure may provide a nozzle for engagement with a washing arm; said nozzle comprising a body comprising a base having a first end and a second end and having a longitudinal axis extending therebetween; said second end of the base being adapted to be engaged with an end of a washing arm; a shaft having a first section that extends longitudinally outwardly from the first end of the base; and a sleeve mounted for rotation about the first section of the shaft; wherein the base defines a bore that originates in the second end and extends for a distance within the first section of the shaft; wherein the exterior surface of the first section of the shaft defines at least one opening therein that is in fluid communication with the bore; and wherein the exterior surface of the first section of the shaft defines one or more grooves therein and the at least one opening is in fluid communication with one of the one or more grooves.

In another aspect, the present disclosure may provide a method of slowing leakage from a nozzle provided on a washing arm of water jet equipment; said method comprising providing a nozzle comprising a body having a base with a first end and a second end and a longitudinal axis extending therebetween; a shaft having a first section that extends longitudinally outwardly from the first end of the base; and a sleeve mounted for rotation about the first section of the shaft; wherein the base defines a bore that originates in the second end and extends for a distance within the first section of the shaft; wherein the exterior surface of the first section of the shaft defines at least one opening therein that is in fluid communication with the bore; and wherein the exterior surface of the first section of the shaft defines one or more grooves therein and the at least one opening is in fluid communication with one of the one or more grooves; engaging the second end of the base with an end of the washing arm; connecting the washing arm to a remote water source; causing a quantity of water to flow through the bore of the base; through the at least one opening; into the one or more grooves and into a space defined between the exterior surface of the shaft and an interior surface of the sleeve; and creating turbulence in the water that is located in the space between the exterior surface of the shaft and the interior surface of the sleeve.

In another aspect, the present method may provide defining a bore in the sleeve and defining one or more openings in the sleeve that extend from an exterior surface of the sleeve to the sleeve's bore; inserting the first region of the shaft through the sleeve's bore; placing the space between the shaft and the sleeve in fluid communication with the one or more openings in the sleeve; and causing at least some of the water that is located in the space between the exterior surface of the shaft and the interior surface of the sleeve to flow out of the one or more openings.

In another aspect, the present method may include trapping particulate material entrained in the water in the one or more grooves. In some embodiments the method may further comprise expelling particulate material entrained in the water through the one or more openings in the sleeve.

In yet another aspect, the present disclosure may provide a method of cleaning an interior of a pipe using water jet equipment; said method comprising providing a nozzle comprising a body having a base with a first end and a second end and a longitudinal axis extending therebetween; a shaft having a first section that extends longitudinally outwardly from the first end of the base; and a sleeve mounted for rotation about the first section of the shaft; engaging the second end of the base with an end of the washing arm; connecting the washing arm to a remote water source; defining a first end aperture, a second end aperture and a third end aperture in a first end of the sleeve; placing the first end aperture, the second end aperture and the third end aperture in fluid communication with a bore defined by the sleeve; directing water outward from the first end aperture, the second end aperture and the third end aperture; and clearing away clogged material from the interior of the pipe using the water directed out of the first end aperture, second end aperture and third end aperture.

In some embodiments the method may include contacting the clogged material with a tip of the shaft; breaking up at least some of the clogged material with the tip to form broken-up material; and clearing away the broken-up material with the water directed out of the first end aperture, the second end aperture, and the third end aperture.

In other embodiments, the method may include directing water outward from the first end aperture and outwardly beyond an exterior surface of the sleeve; directing water outward from the second end aperture and inwardly toward an end of the shaft that projects outwardly from a first end of the sleeve; and directing water outward from the third end aperture and outwardly beyond the exterior surface of the sleeve. The method may further include rotating the sleeve about the shaft by directing water outward from the third end aperture.

In another aspect, the present disclosure may provide a nozzle for engagement with a washing arm; said nozzle comprising a body comprising a base having a first end and a second end and having a longitudinal axis extending therebetween; said second end of the base being adapted to be engaged with an end of a washing arm; a shaft having a first section that extends longitudinally outwardly from the first end of the base; and a sleeve mounted for rotation about the first section of the shaft; wherein the base defines a bore that originates in the second end and extends for a distance within the first section of the shaft; wherein an exterior surface of the first section of the shaft defines at least one opening therein that is in fluid communication with the bore; wherein the exterior surface of the first section of the shaft defines one or more grooves therein and the at least one opening is in fluid communication with one of the one or more grooves; and wherein at least a portion of one or more of the base, the shaft and the sleeve is fabricated from a material containing one or more of tungsten carbide, titanium carbide, carbide with a cobalt binder, carbide with a nickel binder, diamond, silicon diamond, and a ceramic material.

In yet another aspect, the present disclosure may provide a nozzle for engagement with a washing arm; said nozzle comprising a body including a base having a first end and a second end and having a longitudinal axis extending therebetween; said second end of the base being adapted to be engaged with an end of a washing arm; a shaft having a first section that extends longitudinally outwardly from the first end of the base; a sleeve mounted about the first section of the shaft; wherein the sleeve has an outer wall having a first end and a second end; wherein the outer wall defines a bore therein that extends between the first and second ends of the sleeve and the shaft is received through the bore of the sleeve; wherein the base defines a bore that originates in the second end and extends for a distance within the first section of the shaft; and wherein the bore of the base and the bore of the sleeve are in fluid communication; and wherein the outer wall of the sleeve defines at least one aperture that is in fluid communication with the sleeve's bore; and wherein water flowing through the bore of the base flows into the bore of the sleeve and outwardly from the nozzle through the at least one aperture; and wherein the flowing water causes one or both of movement of the sleeve relative to the nozzle and movement of the nozzle relative to the washing arm.

In another aspect, the present disclosure may provide a method of cleaning an interior of a pipe using water jet equipment; said method comprising providing a nozzle comprising a body having a base with a first end and a second end and a longitudinal axis extending therebetween; a shaft having a first section that extends longitudinally outwardly from the first end of the base; and a sleeve mounted for rotation about the first section of the shaft; engaging the second end of the base with an end of a washing arm of the water jet equipment; connecting the washing arm to a remote water source; defining at least one aperture in the sleeve; placing the at least one aperture in fluid communication with a bore defined by the sleeve; inserting the nozzle into a bore of a pipe to be cleaned; directing water outward from the at least one aperture and into the bore of the pipe; moving one of the sleeve relative to the nozzle and the nozzle relative to the washing arm as a result of directing the water out of the at least one aperture; and clearing away a quantity of clogged material from the interior of the bore of the pipe using the water directed out of the at least one aperture. The moving of the nozzle may include rotating the sleeve about the shaft in one of a first direction and a second direction relative to the longitudinal axis. The moving of the nozzle may further include vibrating the nozzle by moving the nozzle back and forth at an acute angle relative to the longitudinal axis. The moving of the nozzle may further include oscillating the sleeve relative to and parallel to the longitudinal axis. The moving of the nozzle may further include oscillating the nozzle relative to the washing arm and parallel to the longitudinal axis.

A nozzle for engagement with a washing arm; said nozzle comprising a body including a base having a first end and a second end and having a longitudinal axis extending therebetween; said second end of the base being adapted to be engaged with an end of a washing arm; a shaft having a first section that extends longitudinally outwardly from the first end of the base; and a sleeve mounted for rotation about the first section of the shaft; wherein the base defines a bore that originates in the second end and extends for a distance within the first section of the shaft; and a coating applied over at least a portion of an exterior surface of one or more of the base, the shaft, and the sleeve.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
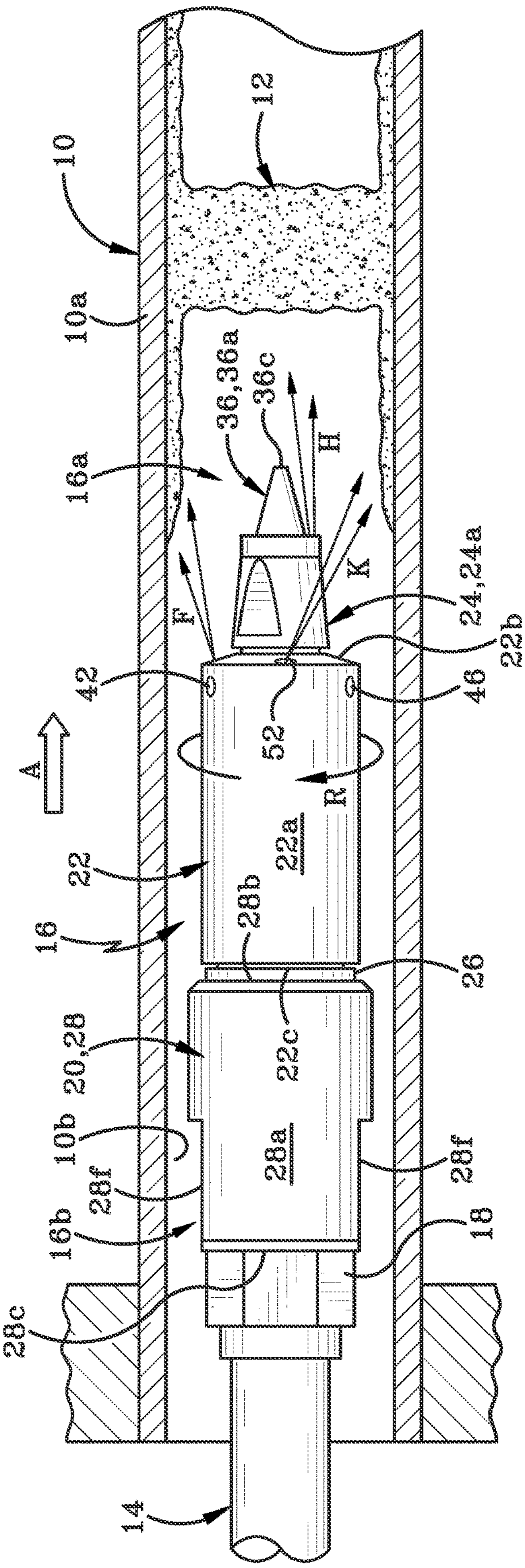
FIG. 1 is a front elevation view of a nozzle for water jet equipment in accordance with the present disclosure where the nozzle is shown traveling through a clogged pipe.

Referring to FIG. 1 there is shown a tube 10 having an exterior circumferential wall 10*a* that bounds and defines an interior bore 10*b*. Tube 10 is provided as a path for a fluid to flow through bore 10*b*. As illustrated in this figure, a blockage or clog 12 has formed across the tube 10. Clog 12 may be comprised of materials that have been dropped by the fluid flowing through bore 10*b* or that have precipitated from the fluid flowing through bore 10*b* and deposited on the interior surface of the wall 10*a*. Clog 12 is illustrated as entirely blocking bore 10*b* but it will be understood that clog 12 might in other instances only partially block bore 10*b*.

A washing arm 14 having a nozzle 16, in accordance with the present disclosure, has been introduced into bore 10*b* to remove clog 12. Washing arm 14 may comprise part of a lance or hose or any other piece of equipment that is selectively insertable into a heat exchanger tube to direct a water jet into the same for cleaning purposes. Washing arm 14 may be selectively moved into an out of a heat exchanger tube during the cleaning operation.

Nozzle 16 has a leading end 16*a* and a trailing end 16*b*. The trailing end 16*b* of nozzle 16 is illustrated as being fixedly engaged with a front end 14*a* of washing arm 14 by way of any suitable pressure fitting 18. It will be understood that washing arm 14 defines a hollow bore therethrough and that washing arm 14 is connected to a remote water supply. Water is delivered via the bore of washing arm 14 to nozzle 16. FIG. 1 shows water being sprayed out of outlets provided proximate the leading end 16*a* of nozzle 16. The sprayed water is directed in a number of different directions (which will be discussed later herein) in order to entirely remove clog 12 from bore 10*b* of tube 10. Nozzle 16 and washing arm 14 is moved in the direction of arrow "A" through bore 10*b* and toward clog 12.

Figure 2:
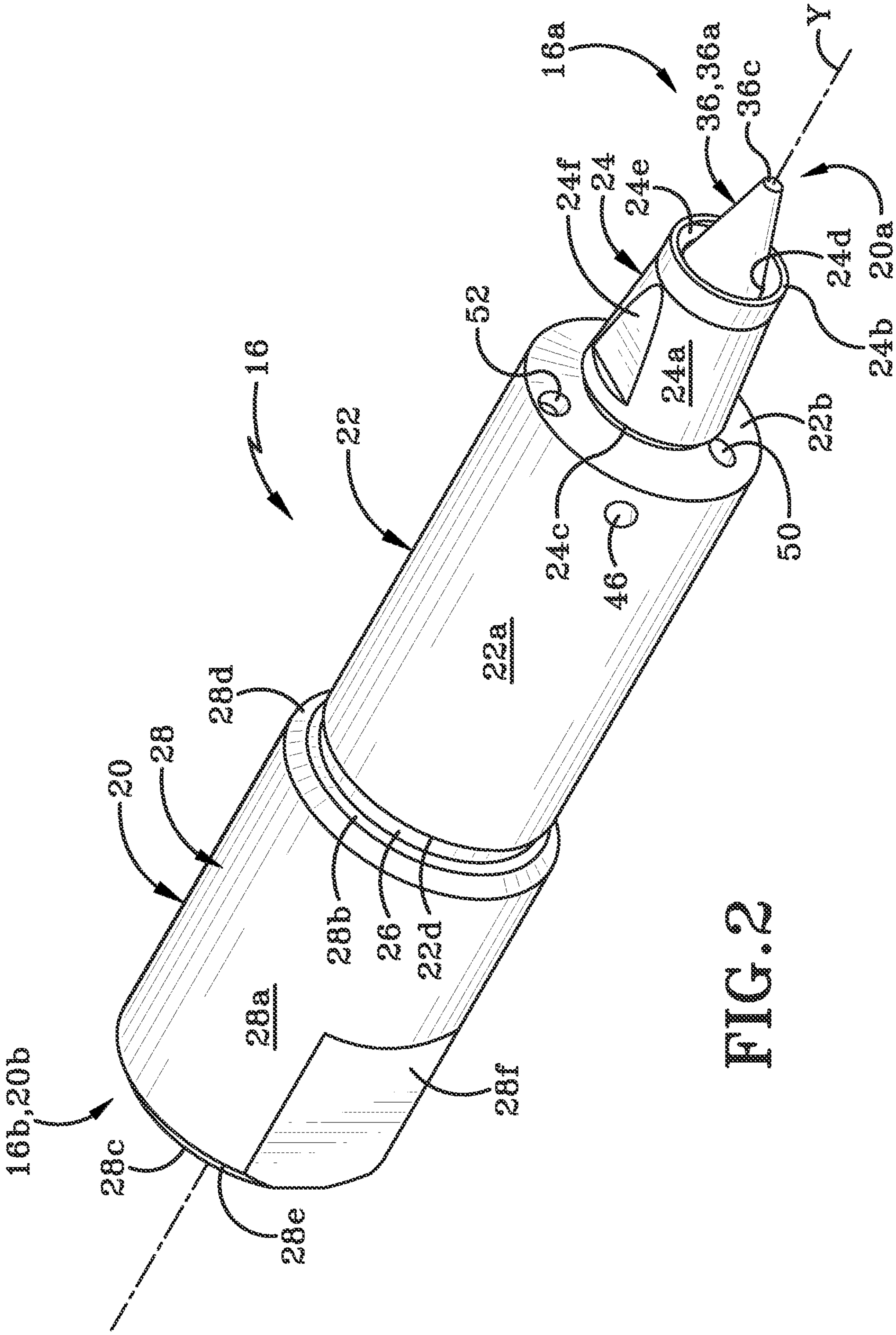
FIG. 2 is a front perspective view of the nozzle in accordance with the present disclosure.
Figure 3:
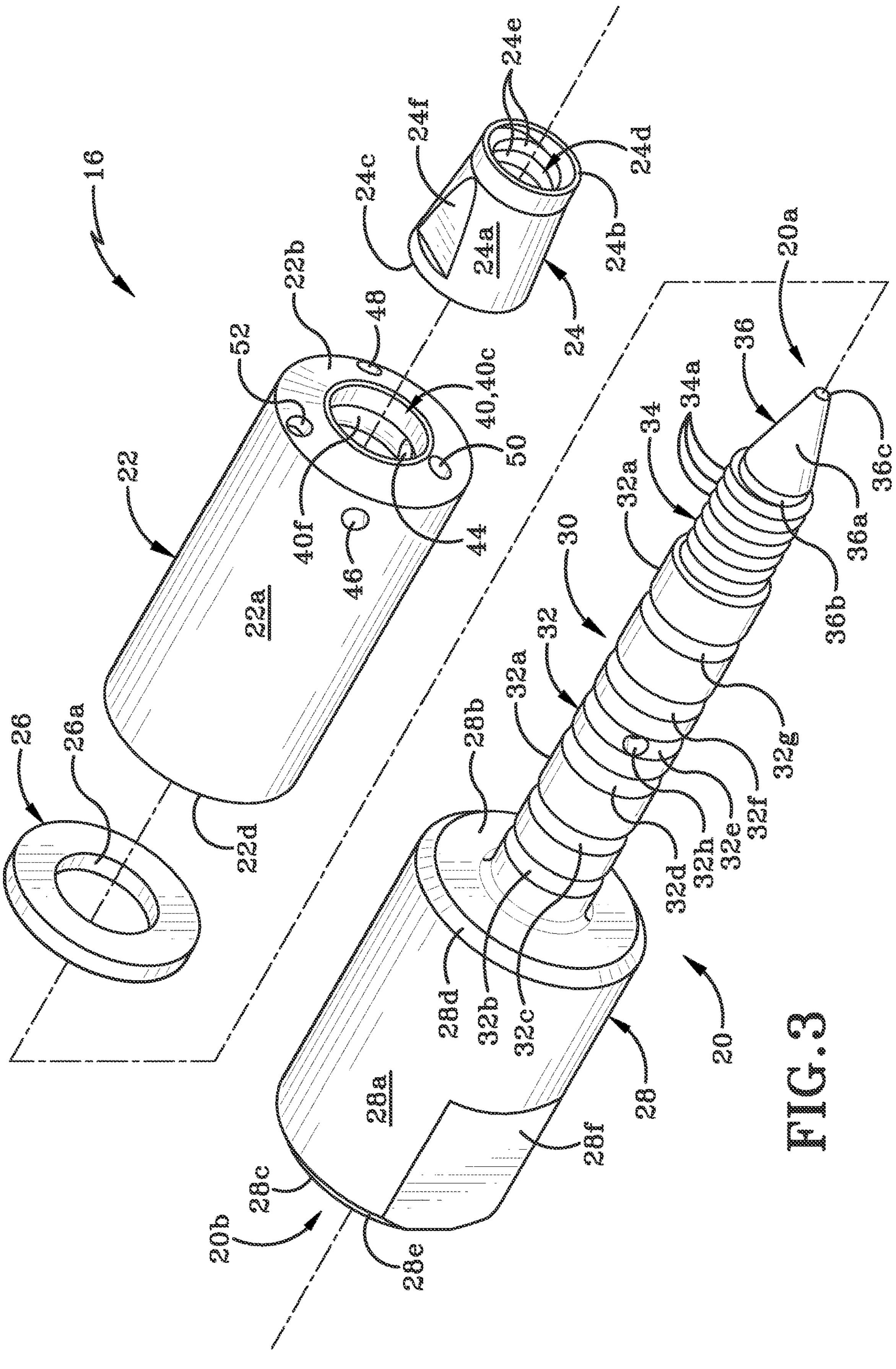
FIG. 3 is an exploded front perspective view of the nozzle.

Referring to FIGS. 2 and 3, nozzle 16 comprises a body 20, a sleeve 22, a nose cone 24 and a washer 26. Body 20 has a leading end 20*a* and a trailing end 20*b*. The leading end 20*a* of body 20 forms the leading end 16*a* of nozzle 16 and the trailing end 20*b* of body 20 forms the trailing end 16*b* of nozzle 16.

Figure 5:
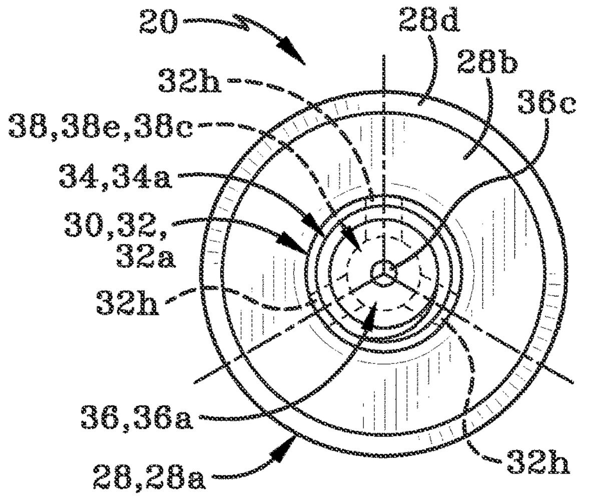
FIG. 5 is a top plan view of the nozzle.
Figure 4:
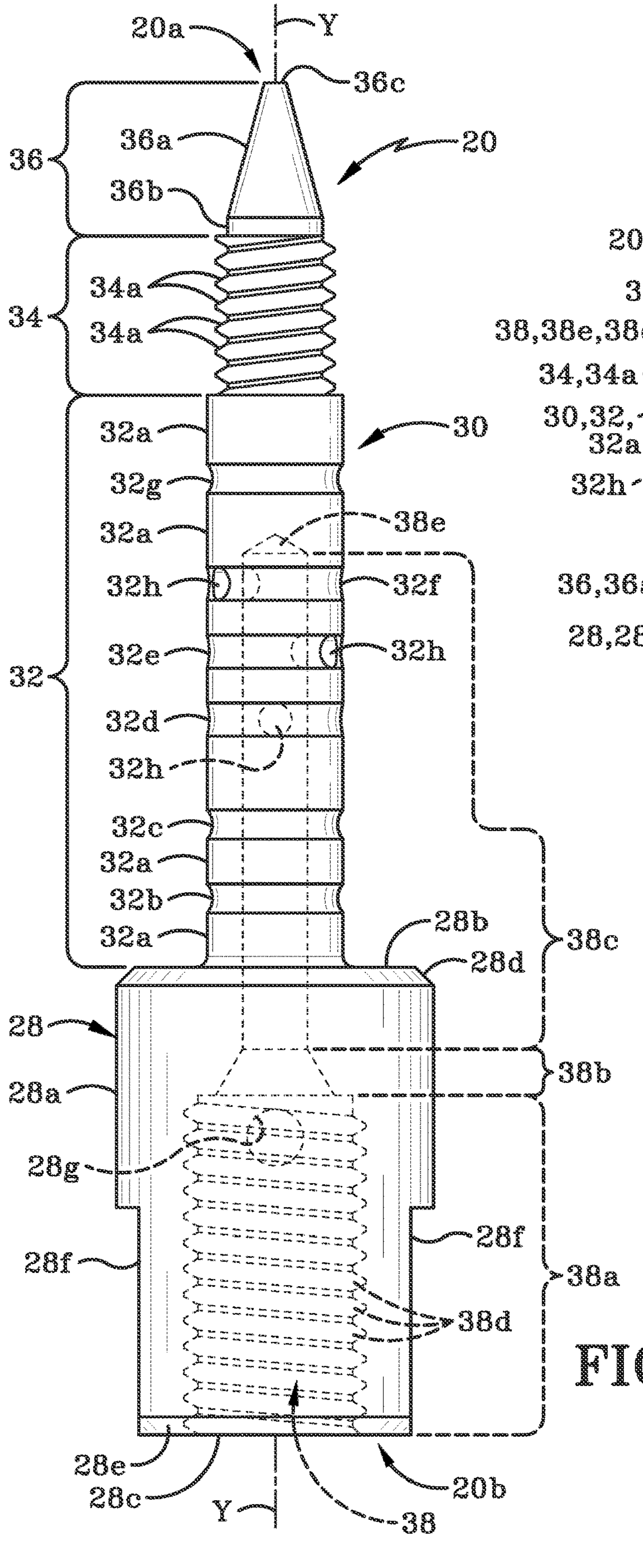
FIG. 4 is a front elevation view of the nozzle.
Figure 6:
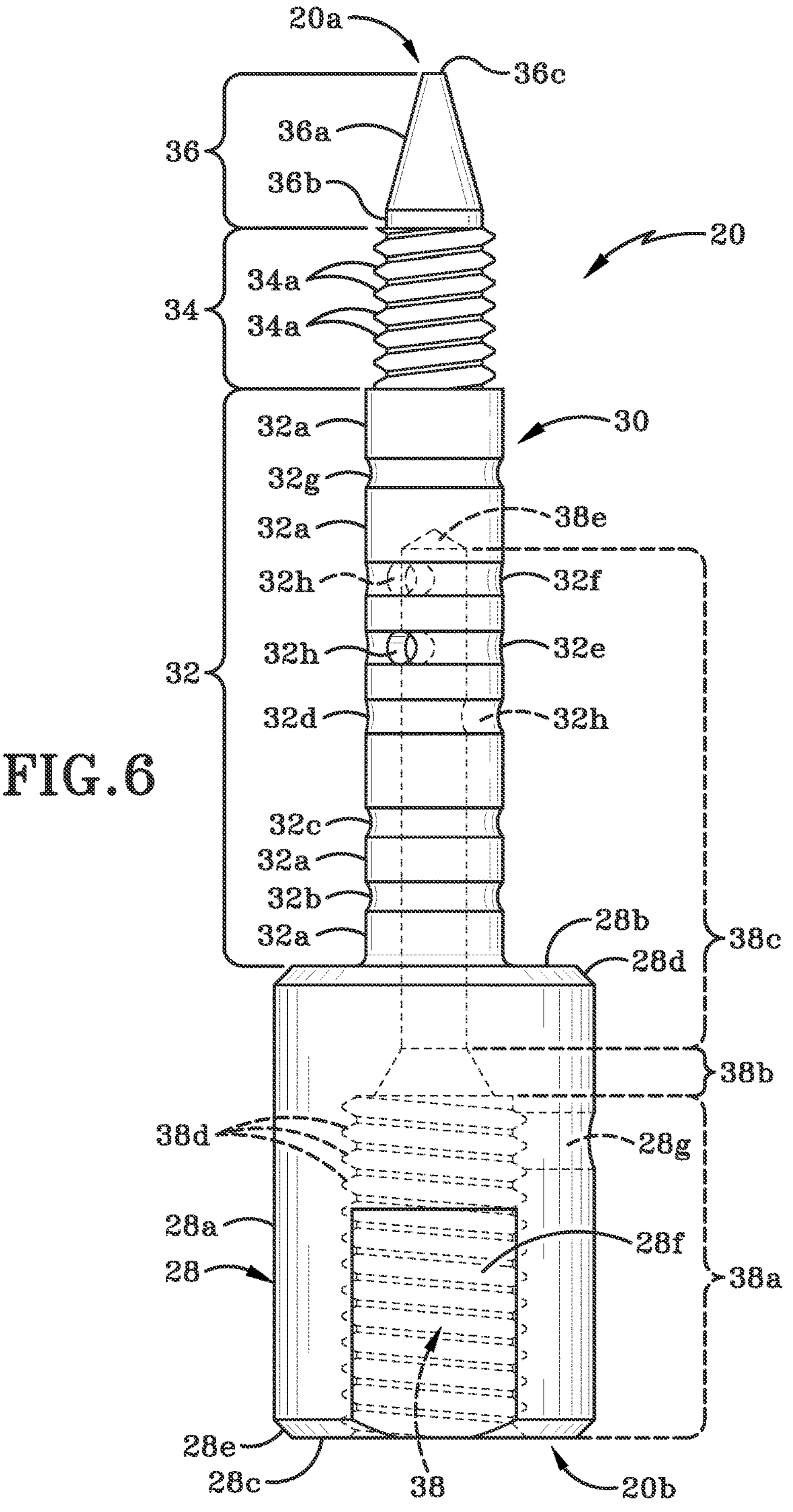
FIG. 6 is a rear elevation view of the nozzle.
Figure 7:
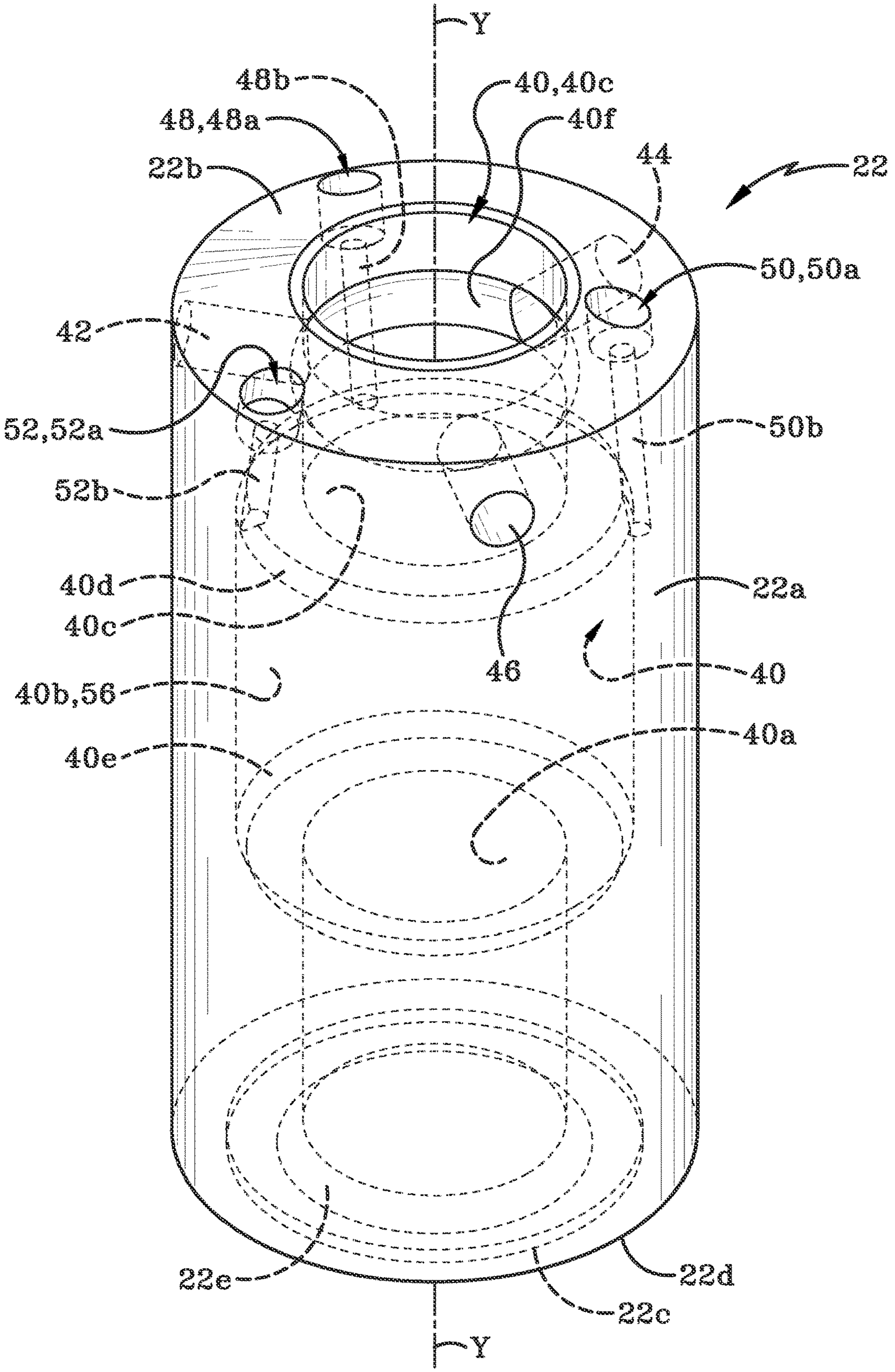
FIG. 7 is a top perspective view of a sleeve shown on its own.

Referring to FIGS. 2-6, body 20 comprises a generally cylindrical base 28 and an aperture 30 that extends outwardly from base 28. Base 28 includes a generally cylindrical outer wall 28*a* that has a first end wall 28*b* and an opposed second end wall 28*c*. An annular first chamfered surface 28*d* extends between outer wall 28*a* and first end wall 28*b*. A second chambered surface 28*e* extends between outer wall 28*a* and second end wall 28*c*. A pair of notched regions 28*f* is formed in the cylindrical outer wall 28*a*. The notched regions 28*f* (FIGS. 4 and 5) are opposed to each other and are recessed relative to the rest of outer wall 28*a*. Instead of being curved like the rest of outer wall 28*a*, notched regions 28*f* are generally flattened or planar. Each notched region 28*f* originates in second end wall 28*c*, extends through second chamfered region 28*e* and extends for a distance upwardly along outer wall 28*a*. Notched regions 28*f* are generally parallel to a longitudinal axis "Y" (FIG. 6) of body 20, where the longitudinal axis "Y" extends from first end 20*a* to second end 20*b*. As shown in FIG. 4, and FIG. 6, a weep hole 28*g* is defined in base 28. Weep hole 28*g* extends from a bore 38 defined in body 20 to an opening defined in outer wall 28*a*. Weep hole 28*g* allows water to escape from the region of bore 38 into which washing arm 14 is threadably engaged.

Body 20 may be a single, monolithic, unitary part that is integrally formed from a material such as stainless steel. Aperture 30 is integrally formed with base 28 and extends outwardly from first end wall 28*b* in a direction substantially parallel to longitudinal axis "Y". Aperture 30 is concentric with the un-notched portion of the outer wall 28*a* of base 28. Aperture 30 is of a reduced diameter relative to outer wall 28*a*.

As shown in FIG. 4, aperture 30 has a number of distinct regions 32, 34 and 36. First section 32 extends longitudinally outwardly from first end 28*b* of base 28; second section 34 extends longitudinally outwardly from first section 32 and third section 36 extends longitudinally outwardly from second section 34. First section 32 is of a greater diameter than second section 34 or third section 36. Second section 34 is of a greater diameter than third section 36.

First section 32 of aperture 30 includes an exterior surface 32*a* in which a plurality of spaced-apart grooves 32*b*, 32*c*, 32*d*, 32*e*, 32*f*, and 32*g* are formed. Each of the grooves 32*b*, 32*c*, 32*d*, 32*e*, 32*f* and 32*g* may be concave and have an arcuate curvature. For example, each groove 32*b*-32*g* may be of a shallow C-shape. Grooves 32*b* may be annular (i.e., extending around the entire circumference of shaft 30) or grooves 32*b* may comprise a plurality of aligned but spaced apart curved sections. Grooves 32*b*-32*g* in one embodiment may be oriented at right angles to longitudinal axis "Y" of body 20. In other embodiments, grooves 32*b*-32*g* may be oriented at an angle other than ninety degrees relative to longitudinal axis "Y". It will be understood that while aperture 30 has been illustrated has having six grooves, fewer than six grooves or more than six grooves may be formed in the exterior surface 32*a* of first section 32. Grooves 32*b*-32*g* may all be of generally the same depth and curvature relative to each other and to the rest of the exterior surface 32*a* of first section 32. In other embodiments the grooves 32*b*-32*g* may be of different depths and curvatures relative to each other. The distances between grooves that are adjacent to each other (i.e., next to each other along the length of first section 32 may vary. For example, the distance between groove 32*b* and 32*c* is smaller than the distance between groove 32*c* and groove 32*d*. In other embodiments the grooves 32*b*-32*g* may be equidistantly spaced from each other.

One or more apertures 32*h* are defined in the exterior wall 32*a* of first section 32 of aperture 30. Each aperture 32*h* preferably originates in one of the groove 32*b*-32*g* and extends inwardly toward a center of first region. Apertures 32*h* may be oriented at right angles to longitudinal axis "Y". The purpose of apertures 32*h* will be later described herein.

Second section 34 of shaft 30 includes an exterior surface in which a plurality of threads 34*a* is formed. Third section 36 is a truncated conical shape and has a substantially smooth exterior surface 36*a* that tapers in diameter from a collar 36*b* to a blunt tip 36*c*. Tip 36*c* does not include any apertures therein. Instead, all of third section 36 may be substantially solid. This conical third section 36 is provided on the end of shaft 30 so that it is positioned to run into a clog or blockage 12 in tube 10 before any of the rest of nozzle (particularly before the rotating sleeve 22) contacts that clog 12. The tip 36*c* hits the clog 12 as washing arm 14 is moved in the direction of arrow "A" (FIG. 1) and tip 36*c* helps to break up and break through clog 12 so that the material from clog 12 may be removed by water spraying out of nozzle 16. The tapered smooth sides of third section 36 helps nozzle move forward through a clogged region in tube 10 more easily than if the surface of third section 36 was textured. The angle on smooth surface 36*a* also helps removed material to be directed away from the region where shaft 30 exits sleeve 22 and where that removed material might otherwise get trapped between sleeve 22 and shaft 30 and stop sleeve 22 from rotating. If second and third regions 34, 36 of shaft 30 were not provided, the sleeve 22 on the nozzle would directly contact clog 12 and might stop rotating and thereby stop cleaning out clog 12. Third section 36 therefore helps sleeve 22 to continue to spin.

Figure 10:
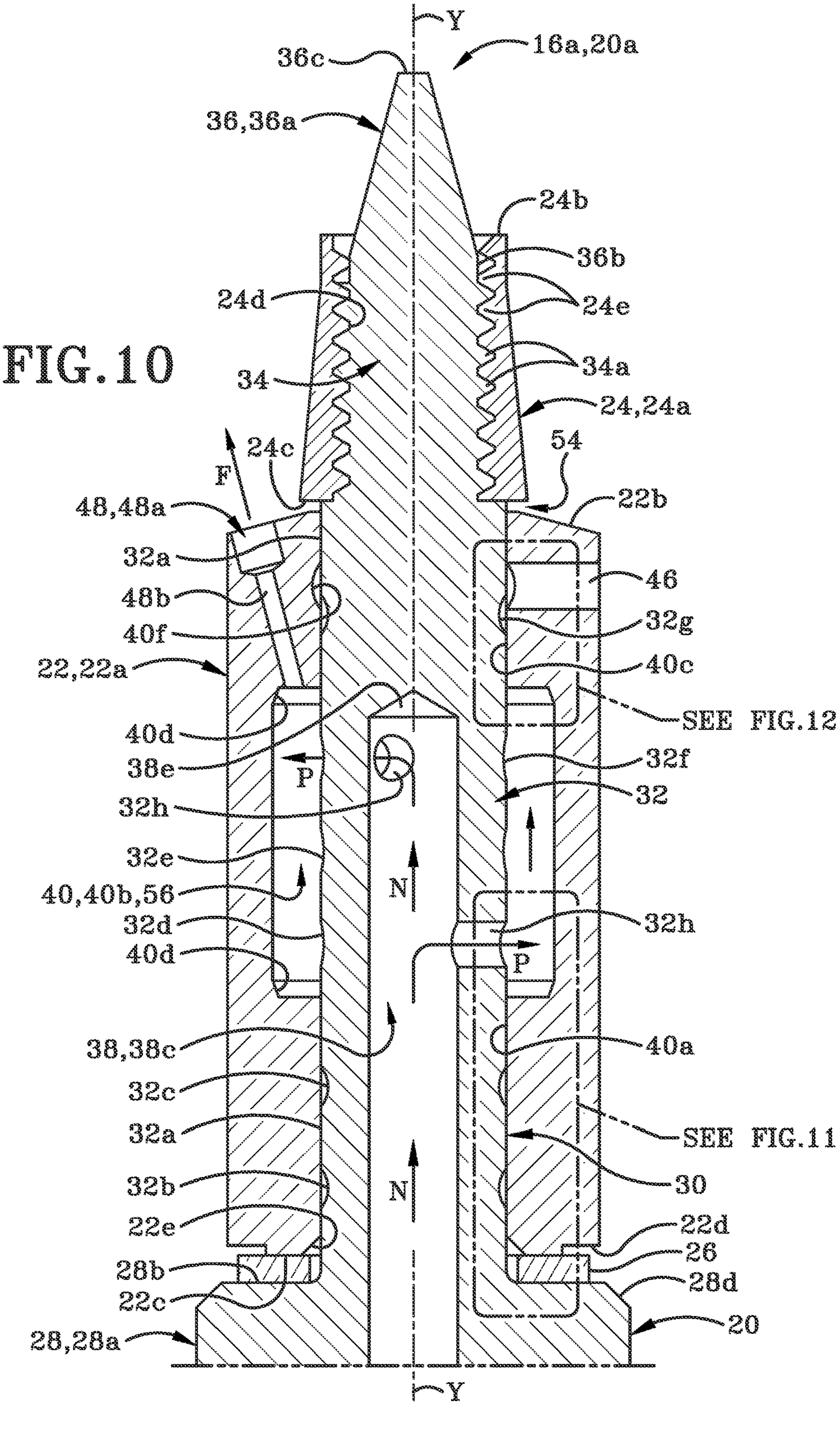
FIG. 10 is a longitudinal cross-section of the nozzle taken along line 10-10 of FIG. 1.

FIGS. 4, 5 and 10 show that body 20 defines an interior bore 38 therein. Bore 38 originates in second end wall 28*c* of base 28 and extends longitudinally inwardly to a terminal end that is located within the length of first section 32 of shaft 30. FIG. 4 shows that bore 38 defined in base 28 comprises three regions 38*a*, 38*b* and 38*c* that are of different diameters. First region 38*a* originates in second end wall 28*c* of base 28 and extends for a distance longitudinally beyond an upper part of notches 28*f*. First region 38*a* terminates a distance inwardly from first end wall 28*b*. First region 38*a* is formed so that the interior surface of body 20 that defines first region 38*a* is internally threaded with threads 38*d*. Second region 38*b* of bore tapers in diameter from the end of first region 38*a* to the beginning of third region 38*c*. Third region 38*c* is of a substantially constant diameter (that is less than the diameter of first region 38*a* and second region 38*b*) until proximate a terminal end 38*e*. Terminal end 38*e* of third region 38*c* is substantially conical. Each of the aperture 32*h* defined in the exterior wall 32*a* of first section 32 of shaft 30 terminates in bore 38. Consequently bore 38 and apertures 32*h* are in fluid communication and water flowing through bore 38 will flow out of apertures 32*h* and into the associated grooves 32*b*-32*g* and then outwardly therefrom. When nozzle 16 is engaged with water supply arm 14, an externally threaded portion of the supply arm 14 will be inserted into first region 38*a* of bore 38 and will be threadably engaged with body 20.

Referring to FIGS. 3 and 7-9C, sleeve 22 is shown in greater detail. Sleeve 22 is configured to be received around an exterior portion of shaft 30 of body 20. In particular, sleeve 22 is received around the first section 32 of shaft 30 in such a way that sleeve 22 will rotate about the exterior surface of first section 32 and thereby around longitudinal axis "Y" of body 20.

Figure 8:
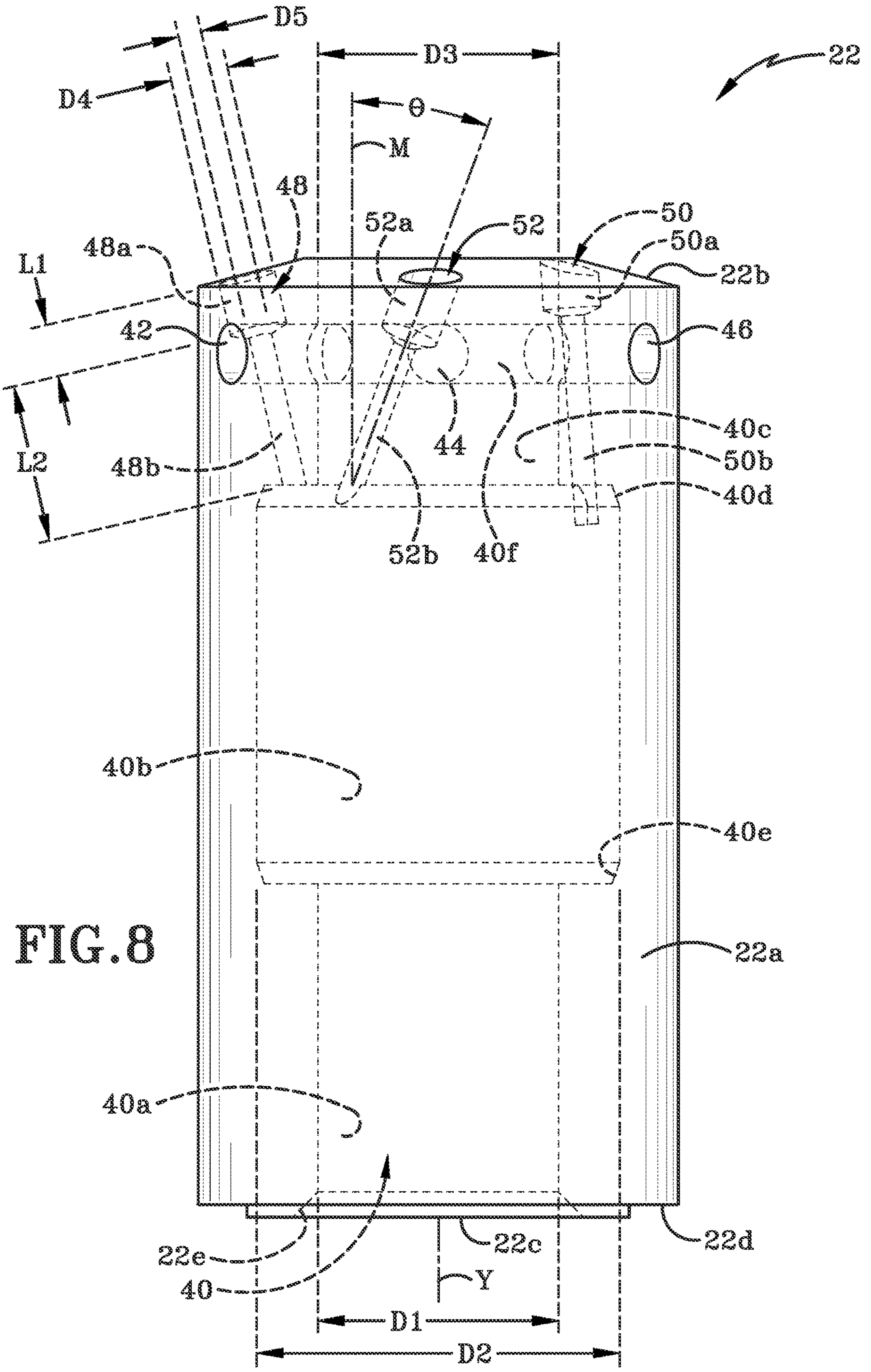
FIG. 8 is a front elevation view of the sleeve of FIG. 7.

Referring to FIGS. 7-9C, sleeve 22 is a tubular member comprising a cylindrical outer wall 22*a* that has a first end wall 22*b* at a first end and a second end wall 22*c* at a second end. Sleeve 22 defines a bore 40 therethrough. Bore 40 extends from an opening in first end wall 22*b* through to an opening in second end wall 22*c*. Referring to FIG. 8, bore 40 comprises a first region 40*a* of a first diameter "D1", a second region 40*b* of a second diameter "D2", and a third region 40*c* of the first diameter "D1". The first diameter "D1" approximate the size of the external diameter of the first region of the shaft 30. Second region 40*b* has a first chamfered surface 40*d* at a top end thereof (i.e., proximate third region 40*c*) and a second chamfered surface 40*e* at a bottom end thereof (i.e., proximate first region 40*a*). First and second chamfered surfaces 40*d*, 40*e* help strengthen sleeve 22. Diameter "D1" of first region 40*a* and third region 40*c* may be slightly larger than the exterior diameter of first section 32 of shaft 30. Second diameter "D2" is larger than the first diameter "D1" and larger than first section 32 of shaft 30. A groove 40*f* is defined in third region 40*c* and as will be seen later herein openings to three apertures 42, 44, and 46 are defined in groove 40*f*.

As best seen in FIG. 8, first end wall 22*b* of sleeve 22 may be beveled and the bevel may be oriented such that first end wall 22*b* is of a widest diameter proximate outer wall 22*a* and is of a smallest diameter proximate the opening to bore 40. Additionally, when sleeve 22 is viewed from the front (such as in FIG. 8), the beveled first end wall 22*b* angles upwardly and inwardly from outer wall 22*a*.

Second end wall 22*c* of sleeve 22 is substantially planar and oriented at right angles to a longitudinal axis Cy' (FIGS. 7 and 8) of sleeve 22, where the longitudinal axis Cy' extends from first end wall 22*b* to second end wall 22*c*. An annular notch 22*d* may be defined in outer wall proximate second end wall 22*c*. As a result, a relatively short region of outer wall 22*a* proximate second end wall 22*c* is of a reduced diameter relative to a remaining portion of outer wall 22*a*. An annular chamfered surface 22*e* (FIG. 11) may be defined in second wall 22*c* and chamfered surface 22*e* may circumscribe and define the opening to bore 40. The chamfered surface 22*e* angles upwardly and inwardly into bore 40.

Outer wall 22*a* of sleeve 22 defines therein a first aperture 42, a second aperture 44 and a third aperture 46. First, second and third apertures 42, 44, 46 are located in a region a short distance downwardly from first end wall 22*b*. As best seen in FIG. 8, first aperture 42, second aperture 44 and third aperture 22*c* are located in a same plane and that plane is oriented at right angles to longitudinal axis Cy'. Each of the first aperture 42, second aperture 44 and third aperture 46 originates in the exterior surface of wall 22*a* and terminates in third region 40*c* of bore 40. Each of the first, second and third apertures 42, 44, 46 thereby placed in fluid communication with bore 40. Furthermore, the first, second and third apertures 42, 44, 46 are located equidistantly from each other around the circumference of wall 22*a*. This can be seen in FIG. 9 where it is illustrated that adjacent apertures (such as first and second apertures 42 and 44; or second and third apertures 44 and 46; or first and third apertures 42 and 46) are located at an angle $\alpha$ (FIG. 9) relative to each other. The angle $\alpha$ is an angle of about 120°. Each of the first, second and third apertures 42, 44 and 46 form channels of substantially constant diameter from the exterior surface of outer wall 22*a* to bore 40.

First end wall 22*b* of sleeve 22 defines a first end aperture 48, a second end aperture 50, and a third end aperture 52 therein. Each of these end apertures 48, 50 and 52 originates in an exterior surface of first end wall 22*b* and extends inwardly and terminates in second region 40*b* of 40. The openings to first, second and third end apertures 48, 50, 52 defined in first end wall 22*b* are located substantially equidistantly from each other around the circumference of first end wall 22*b*. The openings to adjacent end apertures (such as first and second end apertures 48 and 59; or second and third end apertures 50 and 52; or first and third end apertures 48 and 52) are located at an angle $\beta$ relative to each other. The angle $\beta$ is about 120°.

As best seen in FIG. 8, each of the end apertures 48, 50 and 52 is substantially identical in configuration and comprises a first section 48*a*, 50*a* or 52*a*, respectively, that is of a first diameter "D4" and a second section 48*b*, 50*b* or 52*b*, respectively, that is of a second diameter "D5". The second diameter D5" is smaller than the first diameter "D4". Additionally, first section 48*a*, 50*a* or 52*a*, respectively, is of a first length "L1" and second section 48*b*, 50*b* or 52*b*, respectively, is of a second length "L2". The second length "L2" is longer than the first length "L1". First end aperture 48 by way of example comprises first section 48*a* of first diameter "D4" and a first length "L1", and a second section 48*b* of second diameter "D5" and a second length "L2". The second section 48*a* forms a tube that terminates in third region 40*c* of bore 40 and thereby places first end aperture 48 in fluid communication with bore 40.

Figure 9:
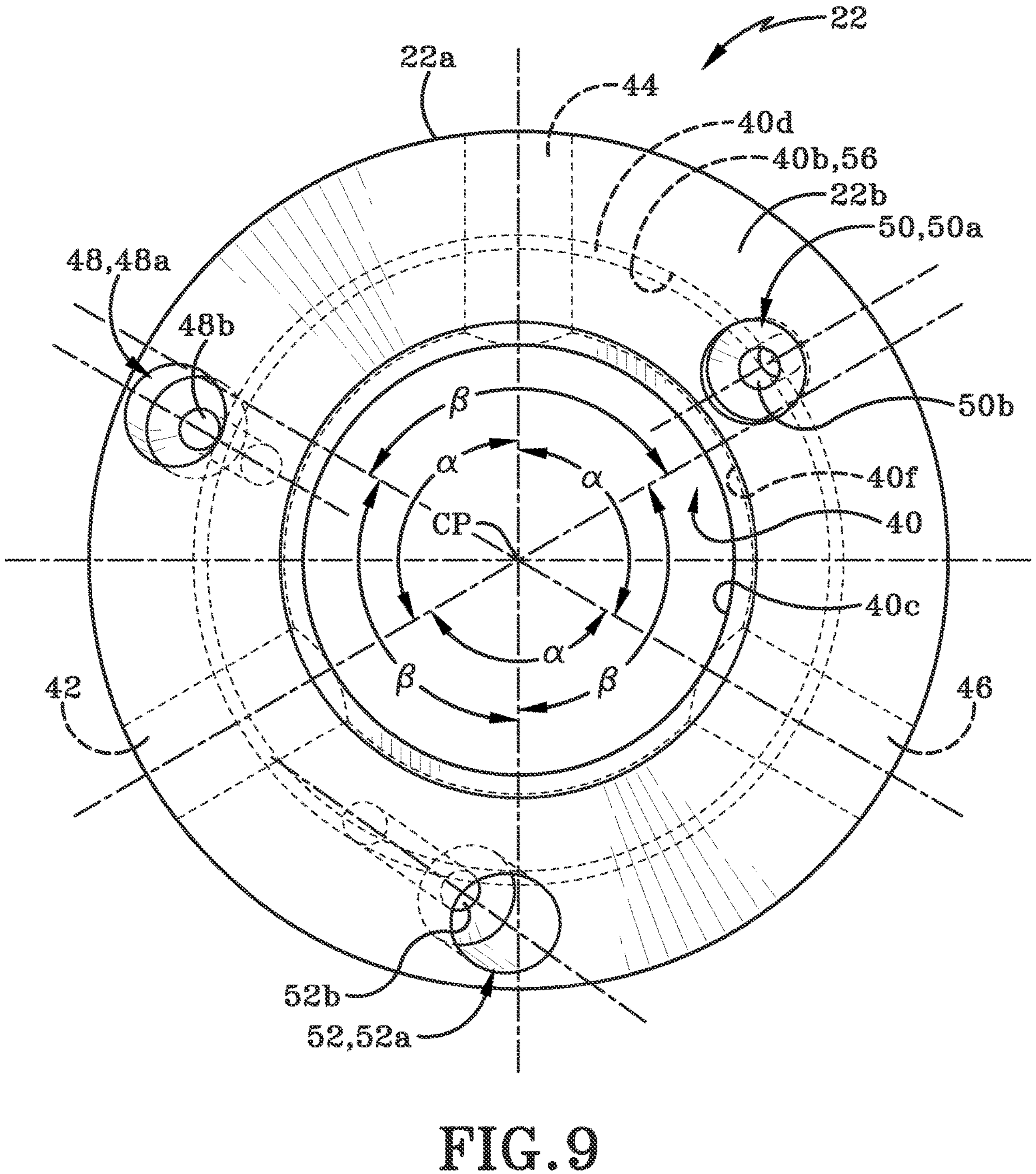
FIG. 9 is a top plan view of the sleeve of FIG. 7 showing the placement and orientation of the various apertures in the exterior wall of the sleeve.
Figure 9A:
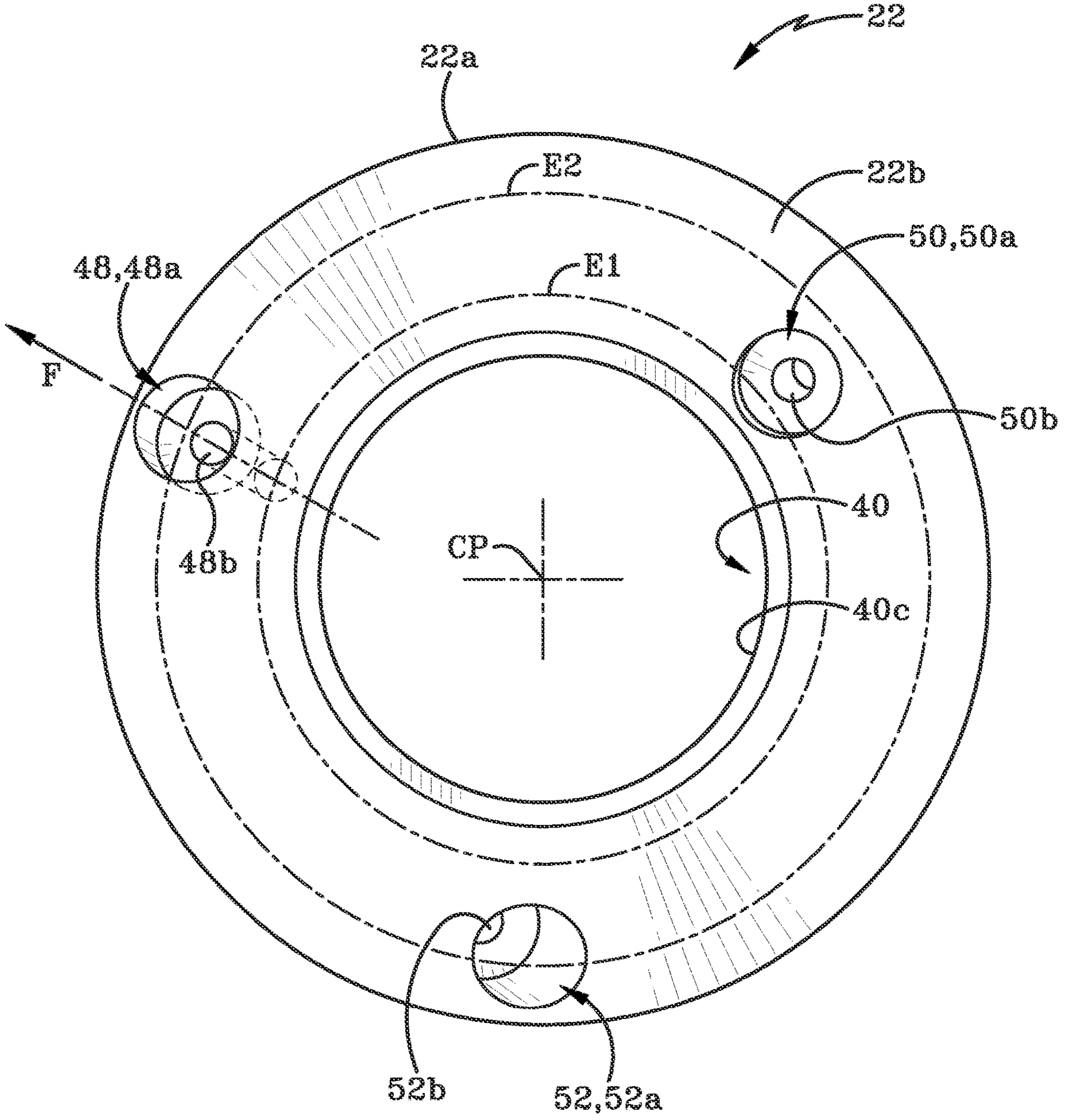
FIG. 9A is a top plan view of the sleeve of FIG. 7 detailing the orientation of the various regions of the first end aperture.
Figure 9B:
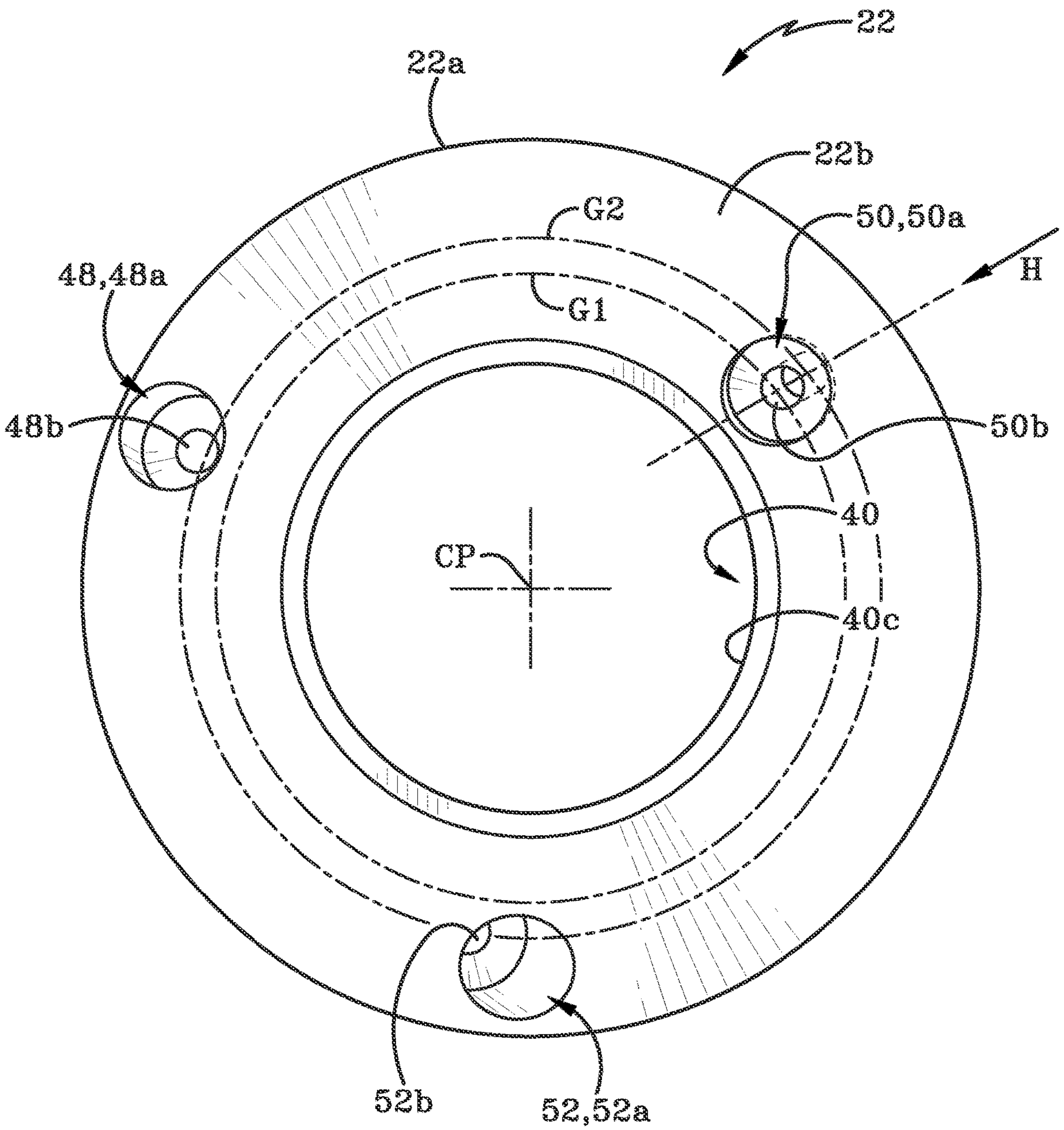
FIG. 9B is a top plan view of the sleeve of FIG. 7 detailing the orientation of the various regions of the second end aperture.
Figure 9C:
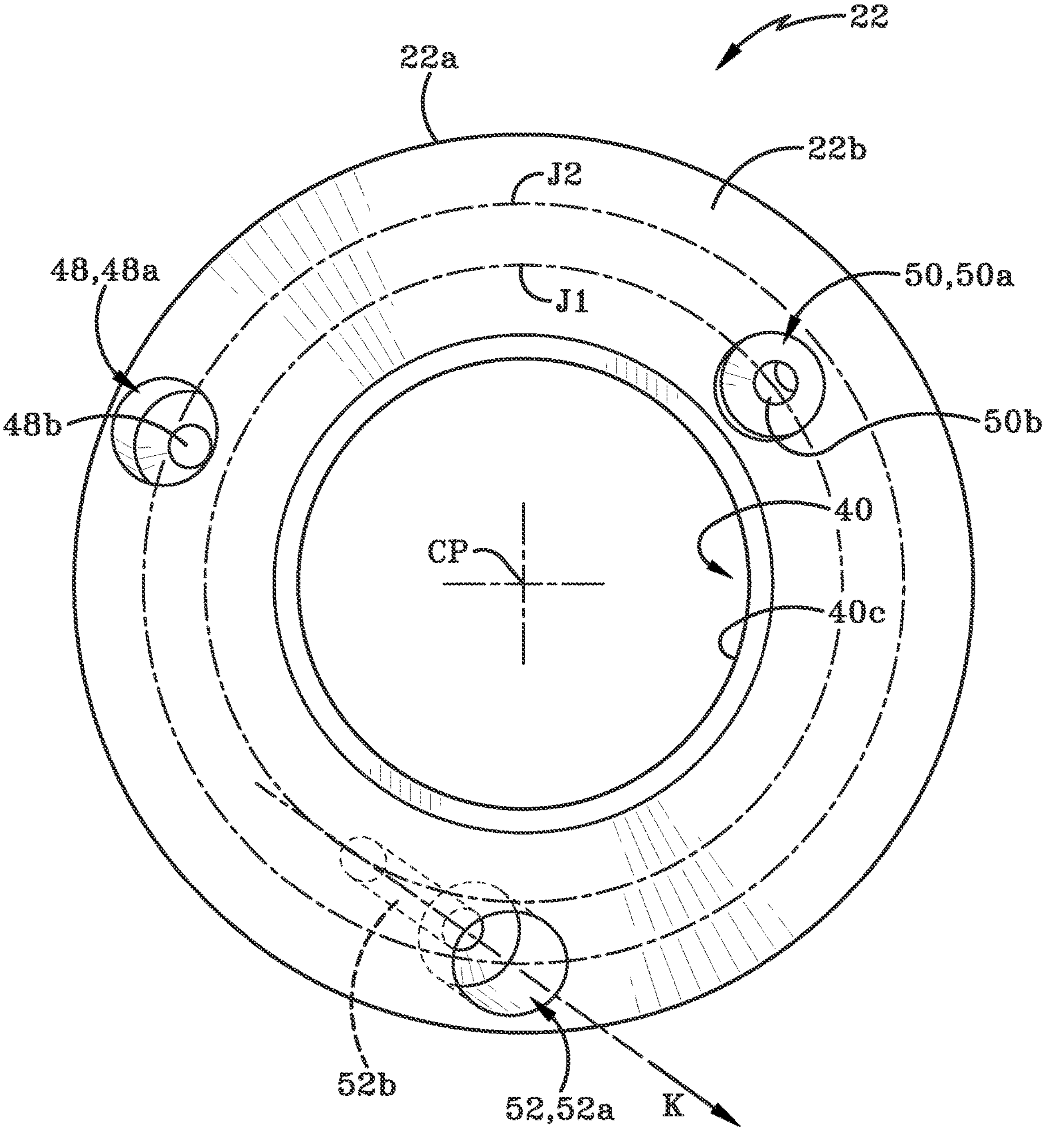
FIG. 9C is a top plan view of the sleeve of FIG. 7 detailing the orientation of the various regions of the third end aperture.

In accordance with an aspect of the present disclosure the first, second and third end apertures 48, 50 and 52 are not all oriented at the same angle relative to bore 40. FIGS. 9A, 9B and 9C are provided to show the orientation of each of the first, second and third end apertures 48, 50, 52. Referring to FIG. 9A, first end aperture 48 is shown in greater detail. An imaginary first circumferential line "E1" and an imaginary second circumferential line "E2" are illustrated in FIG. 9A. Imaginary line "E1" passes through a center point of the opening of second section 48*b* of first end aperture 48 into bore 40. Imaginary line "E2" passes through a center point of the opening of first section 48*a* of first end aperture 48 in first end wall 22*b*. It can be seen that imaginary line "E2" is located further circumferentially outwardly from a center point "CP" of bore 40 relative to imaginary line "E1". As will be understood, first end aperture 48 thus angles outwardly from its opening into bore 40 to its opening in first end wall 22*b*. Thus, when water is flowing through bore 40 and subsequently through first end aperture 48, that water will spray out of the opening in first end wall 22*b* and in a direction angling outwardly away from bore 40 and beyond outer wall 22*a*. That direction is indicated by the arrow "F" in FIG. 9A and in FIG. 14.

Referring to FIG. 9B, second end aperture 50 is shown in greater detail. An imaginary first circumferential line "G1" and an imaginary second circumferential line "G2" are illustrated in FIG. 9B. Imaginary line "G2" passes through a center point of the opening of second section 50*b* of second end aperture 50 into bore 40. Imaginary line "G1" passes through a center point of the opening of first section 50*a* of second end aperture 50 in first end wall 22*b*. It can be seen that imaginary line "G2" is located further circumferentially outwardly from the center point "CP" of bore 40 relative to imaginary line "G1". As will be understood, second end aperture 50 thus angles inwardly from its opening into bore 40 to its opening in first end wall 22*b*. Thus, when water is flowing through bore 40 and subsequently through second end aperture 50, that water will spray out of the opening in first end wall 22*b* and in a direction angling inwardly towards bore 40 and inwardly away from outer wall 22*a*. That direction is indicated by the arrow "H" in FIG. 9B and in FIG. 14.

Referring to FIG. 9C, third end aperture 52 is shown in greater detail. An imaginary first circumferential line "J1" and an imaginary second circumferential line "J2" are illustrated in FIG. 9C. Imaginary line "J1" passes through a center point of the opening of second section 52*b* of third end aperture 52 into bore 40. Imaginary line "J2" passes through a center point of the opening of first section 52*a* of third end aperture 52 in first end wall 22*b*. It can be seen that imaginary line "J2" is located further circumferentially outwardly from a center point "CP" of bore 40 relative to imaginary line "J1". As will be understood, third end aperture 52 thus angles outwardly from its opening into bore 40 to its opening in first end wall 22*b*. Thus, when water is flowing through bore 40 and subsequently through third end aperture 52, that water will spray out of the opening in first end wall 22*b* and in a direction angling outwardly away from bore 40 and beyond outer wall 22*a*. That direction is indicated by the arrow "K" in FIG. 9C and in FIG. 14.

As shown in FIG. 8, the third end aperture 52 is oriented at an angle θ relative to an imaginary line "M" that is parallel to longitudinal axis cy'. The orientation of third end aperture 52 is such that water flowing out therefrom in the direction of arrows "K" will cause sleeve 22 to rotate about shaft 30. The faster water flows out of third end aperture 52, the faster sleeve 22 rotates about longitudinal axis "Y".

Referring to FIGS. 3, and 10, nose cone 24 comprises a wall 24*a*, a first end wall 24*b*, and a second end wall 24*c*. A bore 24*d* extends from an opening in first end wall 24*b* to an opening in second end wall 24*c*. The interior surface of wall 24*a* that bounds and defines bore 24*d* is threaded with threads 24*e*. Threads 24*e* are configured to threadably engage with threads 34*a* on second section 34 of shaft 30 of body 20. Wall 24*a* tapers in diameter from first end wall 24*b* to second end wall 24*c*. A generally inverted V-shaped depression 24*f* is defined in outer wall 24*a*.

FIG. 10 shows nozzle 16 fully assembled. Shaft 30 of body 20 is inserted through the hole 26*a* defined in washer 26. Shaft 30 is then inserted into bore 40 of sleeve 22 through the opening defined in second end wall 22*c*. First section 32 of shaft 30 is retained within bore 40 of sleeve 22. Second and third regions 34, 36 of shaft 30 extend outwardly for a distance from first end wall 22*b* of sleeve 22. Third section 36 of shaft 30 is then inserted into the opening defined by second end 24*c* of nose cone 24 and into bore 24*d* thereof. Threads 24*e* of nose cone 24 are threadably engaged with threads 34*a* on second section 34 of shaft 30. Nose cone 24 is rotated until second end 24*c* thereof is located immediately above first end wall 22*b* of sleeve 22. Nose cone 24 is utilized as a nut to keep the body 20, washer 26 and sleeve 22 engaged with each other and prevents sleeve 2 from sliding off shaft 30.

As is evident from FIG. 10, when nozzle 16 is assembled, washer 26 is seated between second end wall 22*c* of sleeve 22 and first end wall 28*b* of base 28. First end wall 28*b* of base 28 forms a shoulder upon which washer 26 is seated. The aperture 26*a* in washer 26 is large enough to circumscribe shaft 30 but is too small to be seated within notch 22*d* of sleeve. Washer 26 therefore acts as a spacer between first end wall 28*b* of base 28 and second end wall 22*c* of sleeve 22. Additionally, there is a gap 54 defined between second end 24*c* of nose cone 24 and first end wall 22*b* of sleeve 22. The presence of washer 26 and gap 54 ensures that sleeve will be able to rotate freely about shaft 30 during operation of nozzle 16.

Figure 11:
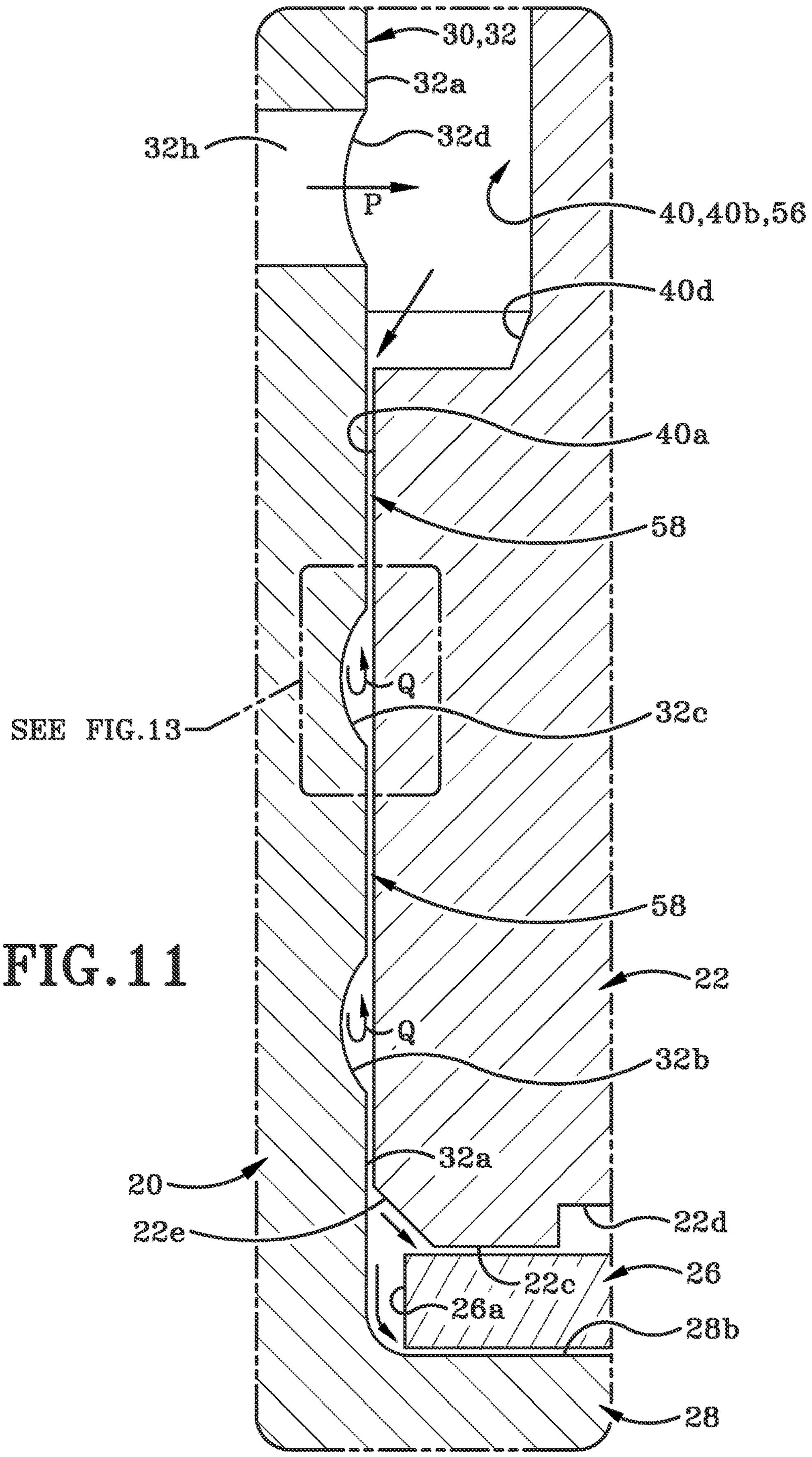
FIG. 11 is an enlargement of the highlighted region of FIG. 10 entitled "See FIG. 11"
Figure 12:
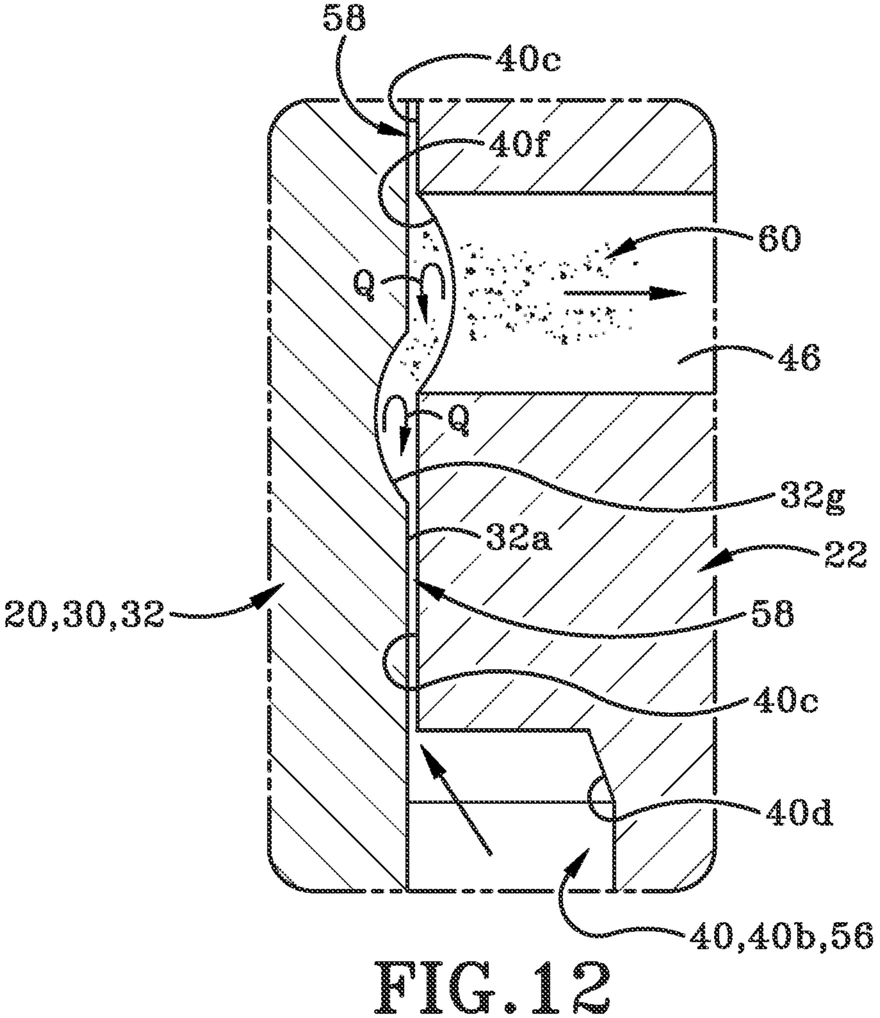
FIG. 12 is an enlargement of the highlighted region of FIG. 10 entitled "See FIG. 12"
Figure 13:
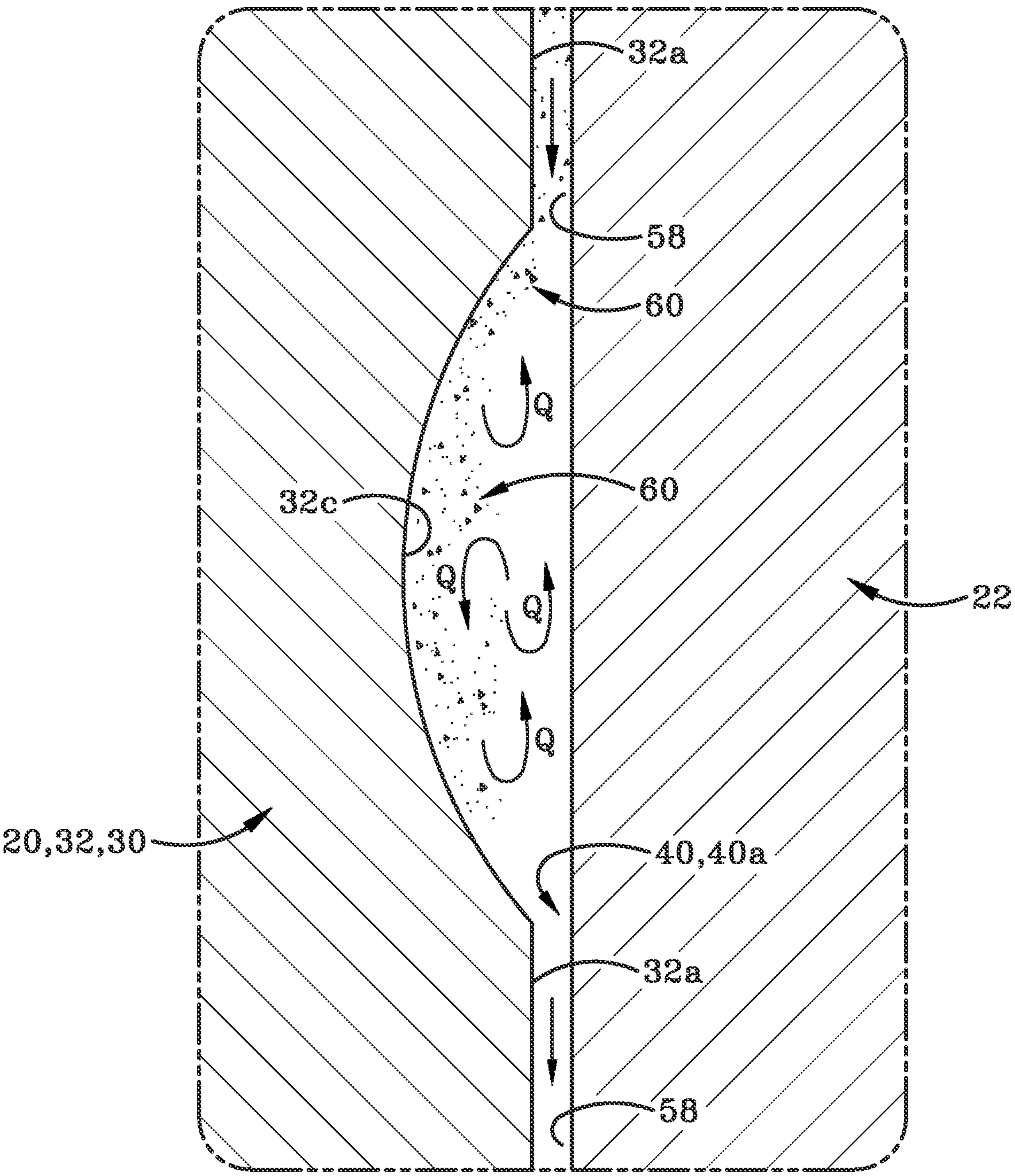
FIG. 13 is an enlargement of the highlighted region of FIG. 11 entitled "See FIG. 13"

FIGS. 10-13 also show that a chamber 56 is defined between the exterior surface 32*a* of first section 32 of shaft 30 and the interior surface of sleeve 22 that defines second region 40*b* of bore 40. FIG. 11 shows that a space 58 is defined between exterior surface 32 of shaft 30 and the interior surface of sleeve that defines first region 40*a* and third region 40*c* of bore 40. Chamber 56, space 58 and all of the annular grooves 32*b*, 32*c*, 32*d*, 32*e*, 32*f* and 32*g* and bore 38*c* are all in fluid communication with each other. Additionally, because apertures 42, 44, 46 extend from third region 40*c* of bore 40 through to exterior surface 22*a* of sleeve 22, apertures 42, 44, 46 are also in fluid communication with chamber 56, space 58, grooves 32*b*-32*g* and bore 38*c*. Still further, because first, second and third end apertures 48, 50 and 52 extend from openings into second region 40*b* of bore 40 to first end wall 22*b*, first, second and third end apertures 48 50 and 52 are in fluid communication with chamber 56, space 58, annular grooves 32*b*-32*g* and bore 38*c*. Finally, space 58 is open at a first end proximate washer 26 and at a second end proximate nose cone 24.

Washer arm 14 is threadably engaged with the threads 38*d* of base 28 to engaged nozzle 16 with washer arm 14. When a remote water supply is activated, water flows from a bore defined in washer arm 14 into bore 38 of body 20. This water flow is indicated by arrow "N" in FIG. 10. As water flows through bore 38, some of the water will be diverted into each of the apertures 32*h* (as indicated by arrows "P") and thereby into and along the associated grooves 32*b*-32*g* and subsequently into space 58 and chamber 56. As chamber 56 fills up, water will begin to flow out of first, second and third end apertures 48, 50 and 52. When the water flowing through space 58 reaches first, second and third apertures 42, 44, 46, water will flow out of those apertures and into the environment surrounding nozzle 16.

Since shaft 30 is fixedly connected to washer arm 14, shaft 30 remains stationary and sleeve 22 rotates about shaft 30 in the direction indicated by arrow "R" in FIG. 1. The rotation of sleeve 22 is caused by water flowing rapidly out of third end aperture 52. Water in space 58 and in chamber 56 acts as a water bearing that enables sleeve 22 to freely rotate about shaft 30.

Since water is delivered from washer arm 14 to nozzle 16 under high pressure some of the water in space 58 will tend to forced out of the top end and bottom end of space 58, i.e., proximate nose cone 24 and proximate washer 26. This leakage is slowed relative to prior art nozzles. Typically, the rate of leakage from PRIOR ART nozzles would be in the range of about eight gallons per minute. FIGS. 10-13 shows water flowing from apertures 32*h* and into space 58. Small vortices are created in the water moving through space 58 wherever that water encounters one of the grooves 32*b*-32*g*. The vortices create turbulence (indicated by arrows "Q") in the water and this turbulence tends to slow the rate of water leakage from the top end and bottom end of space 58. The rate of leakage from nozzle 16 is in the range of about one and half gallons per minute as opposed to the around eight gallons per minute of PRIOR ART nozzles. The decrease in water leakage in the present nozzle 16 is thus substantial.

The turbulence created by the presence of grooves 32*b*-32*g* and by groove 40*f* defined in sleeve 22 helps to remove any small particulates 60 entrained in the water flowing through nozzle to become trapped in the grooves 32*g*-32*g*. The turbulence causes some of these small particulate materials to simply circulate in grooves 32*b*-32*g* or to flow out of the first, second or third apertures 42, 44, 46 with water that works its way through space 58 to third region 40*c* of bore 40. This entrapment of removal of particulate materials 60 helps ensure that these particulates will not lodge between the rotating sleeve 22 and the stationary shaft 30. If particulates become lodged in space 58 they may prevent sleeve 22 from rotating properly and therefore stop cleaning as efficiently.

Figure 14:
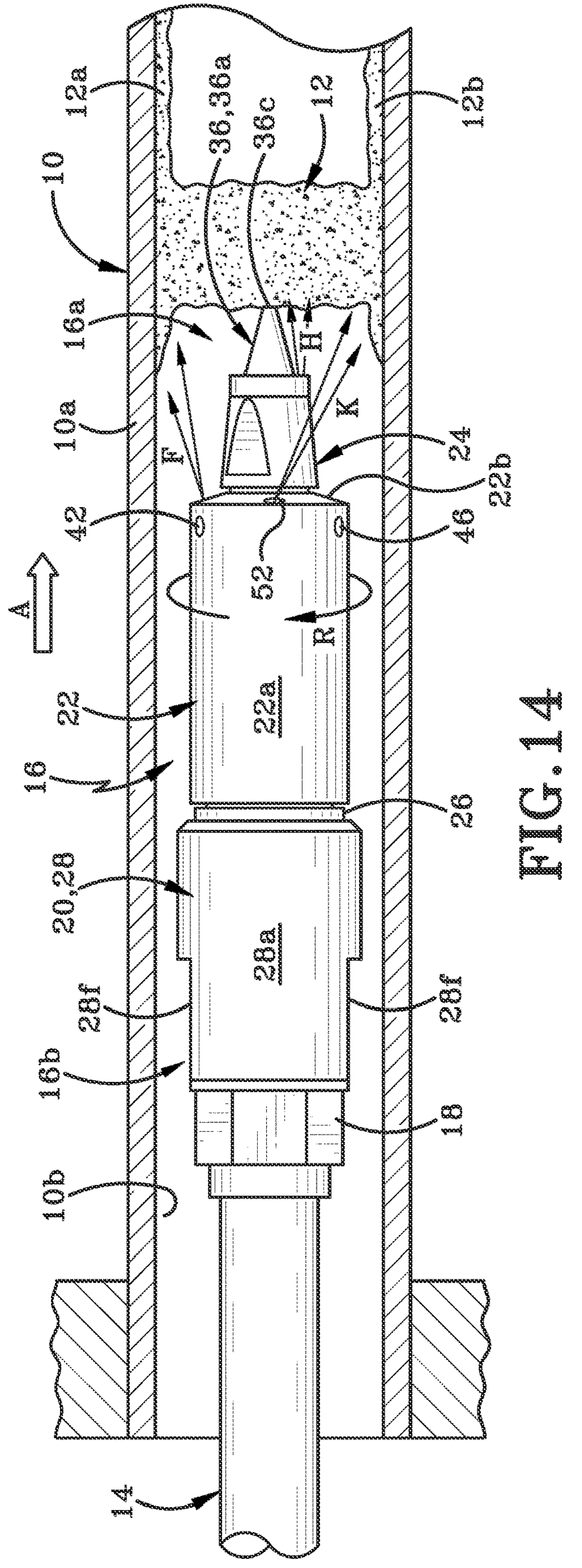
FIG. 14 is a front elevation view of the nozzle rotating within a clogged pipe.
Figure 15:
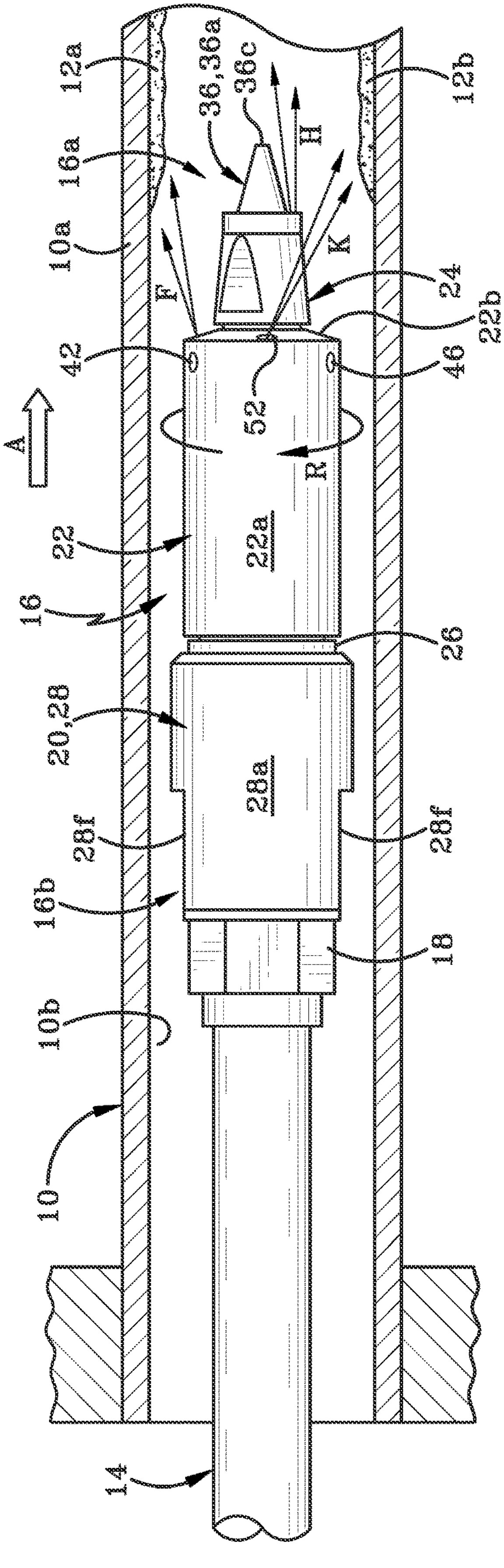
FIG. 15 is a front elevational view of the nozzle rotating within the pipe having cleared away at least part of the clogged region.

Referring to FIGS. 14 and 15, the washing arm 14 is inserted into bore 10*b* of tube 10 and is advanced in the direction of arrow "A" through bore 10*b*. As washing arm 14 is moved in this direction, sleeve 22 rotates about the longitudinal axis "Y" (FIG. 10) of nozzle 16 in the direction indicated by arrow "R". (It should be noted that sleeve 22 may, alternatively, rotate in the opposite direction to arrow "R" in other embodiments of the nozzle in accordance with the present disclosure.) Rotation of sleeve 22 is caused by the flow of pressurized water through the angled third end aperture 52. Not only does the flowing water out of third end aperture 52 rotate sleeve 22, but the high pressure water jet from third end aperture 52 also contacts the interior surface of tube 10 and scours deposited material therefrom. At the same time, a high pressure water jet flows out of first end aperture 58 and contacts and scours the interior surface of tube 10. Furthermore, a high pressure water jet flows out of second end aperture 50 towards tip 36*c* of third section 36. (It should be noted that second end aperture 50 may be oriented at an angle that is substantially the same as the angle of taper on the conical outer wall 36*a* of third section 36.) The high pressure water jet flowing out of second end aperture 50 helps lubricate the tube helps remove material that may be located in front of the advancing nozzle 16.

FIG. 14 shows a clog 12 entirely blocking tube 10. As washing arm 14 and the engaged nozzle 16 continue to move in the direction of arrow "A", tip 36*b* of third section 36 will run into clog 12. Tip 36*c* and third section 36 along with the water jet flowing from second end aperture 50 act as a battering ram on clog 12 to help break and flush away bits of material from in front of nozzle 16. The rotating water jets spraying out of first end aperture 48 and third end aperture 52 clear away built up material from the interior surface of tube 10. FIG. 15 shows that clog 12 has been broken up and flushed away by nozzle 16 and the water jets spraying out of first end aperture 48 and third end aperture 52 are scouring away the rest of the built up material 12*a*, 12*b* from the interior surface of tube 10. The section of tube 10 through which nozzle 16 has already passed is free of built up material and clogs.

It will be understood that the locations of grooves 32-32*g* on shaft 30 with respect to that of the sleeve 22 maintain a rearward force, pushing the sleeve 22 against the washer 26 and the first end wall 28*b* (i.e., the shoulder of base 28 upon which washer 26 is seated). This force is offset by leaking water between the washer 28, first end wall 28*b* and sleeve 22 in a relationship that minimizes leakage but allows a proportional amount of leakage that is sufficient to provide a water thrust bearing.

In an exemplary embodiment, the tip 36*c*, and third section 36 along with the water jet flowing from second end aperture 50 act as a battering ram on clog 12 to help break and flush away bits of material from in front of nozzle 16. The rotating water jets spraying out of first end aperture 48 and third end aperture 52 clear away built up material from the interior surface of tube 10.

In an exemplary embodiment, movement of the washer arm 14 and consequently the tip 36*c* and third section 36 along with the water jet flowing from second end aperture 50 act as a battering ram on clog 12 to help break and flush away bits of material from in front of nozzle 16. The rotating, rotation, vibration, translation, oscillation, and reciprocation movement of water jets spraying out the apertures 48, 50, and 52 clear away built-up material from the interior surface of tube 10.

Since nozzle 16 is used as a battering ram and because water is delivered through nozzle 16 at high pressures, wear and tear and potential breakdown of parts of nozzle 16 may occur over time. To aid in addressing this issue, at least a portion of the nozzle 16 may contain or be fabricated from particular materials that will be discussed hereafter. For example, one or more of the body 20 (including the base 28, first section 32, second section 34 and third section 36), the rotating sleeve 22, the nose cone 24 and the shaft 30, may wholly contain or be wholly fabricated from any one of a wide variety of selected materials or from a combination of selected materials. Materials may be chosen that have desirable mechanical and materials properties with respect to one or more of durability, strength, sealability, impact resistance, and resistance to corrosion. In an exemplary embodiment, one or more of the component parts of the nozzle 16 may be comprised of a high strength metal or a high strength non-metal that is suitable for coming into contact with high pressure water. Such materials include but are not limited to, tungsten carbide, titanium carbide, carbide with cobalt binder, carbide with nickel binder, diamond, silicon diamond, and ceramic. The term "ceramic" may include, but is not limited to ceramic materials that include alumina, zirconia, beryllia, mullite, cordierite, silicon carbide, quartz, intermetallics, boron, graphite, carbon, silicon, and various other carbides, nitrides, aluminides, or borides, glasses, machinable glasses; oxides of aluminum, magnesium, chromium, silicon, titanium, or zirconium, nitrides of aluminum, magnesium, chromium, silicon, titanium, or zirconium, hydrides of aluminum, magnesium, chromium, silicon, titanium, or zirconium, and other compounds of reactions of the aforementioned metals with a surrounding environment.

Figure 16:
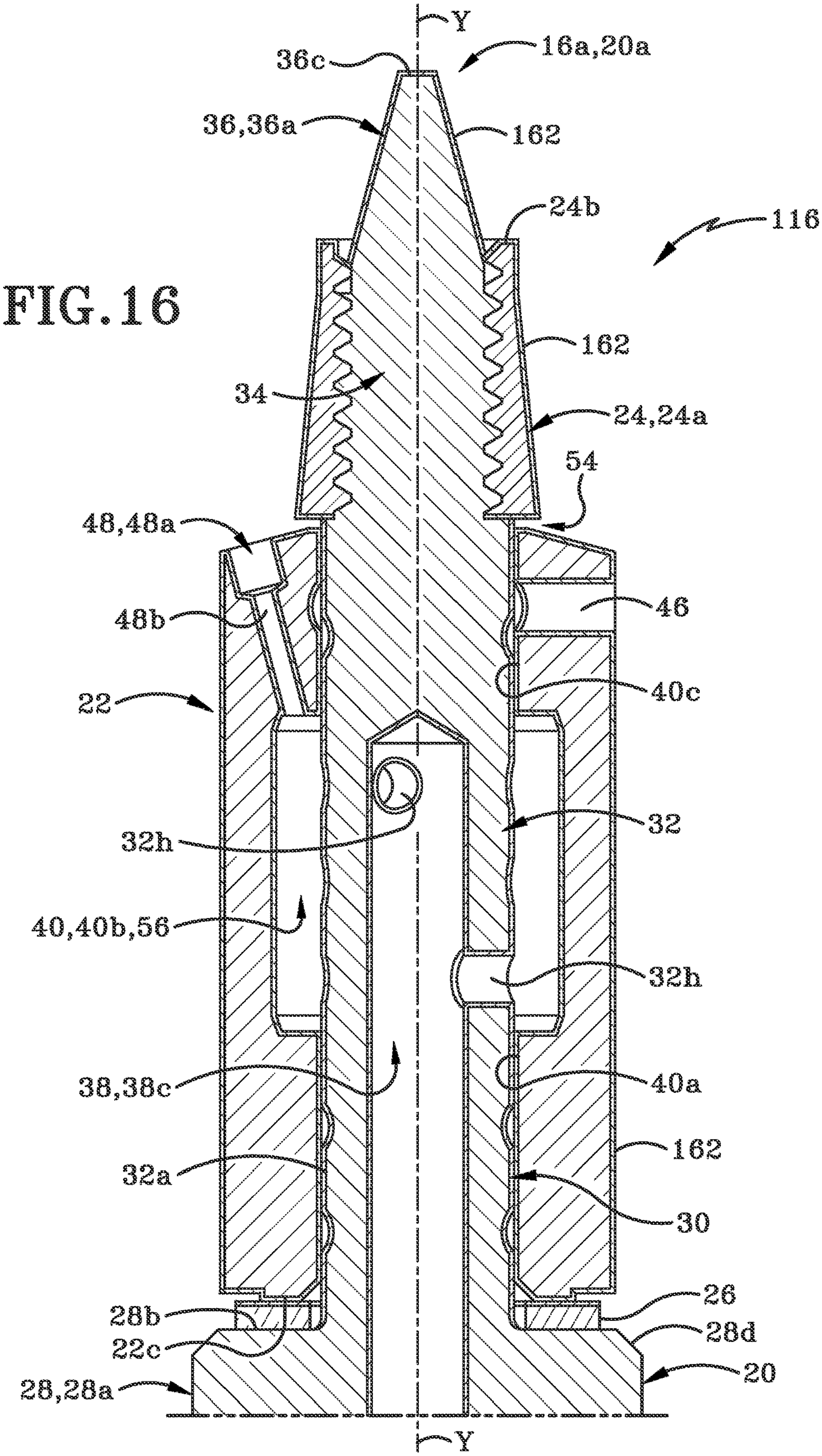
FIG. 16 is a longitudinal cross-section of a second embodiment of a nozzle in accordance with an aspect of the disclosure, wherein the cross-section is similar to the cross-section taken along line 10-10 of FIG. 1, and the nozzle includes an exterior coating comprised of a material different to the material used to fabricate the nozzle.

Referring now to FIG. 16, there is shown a cross-section of a second embodiment of a nozzle in accordance with an aspect of the present disclosure generally indicated at 116. Nozzle 116 differs from nozzle 16 (shown in FIG. 10) in that the nozzle 116 is fabricated from a first material and a coating 162 of a second material may be applied over various surfaces of the component parts of nozzle 116. Instead of fabricating the nozzle 116 entirely from one of the previously listed materials as in the first embodiment, coating 162 of a specific material may be utilized instead. This coating 162 may be applied instead of fabricating the entire nozzle out of the same material in order to reduce material costs, or in order to more accurately select materials with different wear patterns and desirable properties relative to the material utilized for the rest of the nozzle 116. As illustrated in FIG. 16, coating 162 has been applied over substantially the entire exterior surface of the nozzle 116, including the body 20 (including the base 28, first section 32, second section 34 and third section 36), the rotating sleeve 22, the nose cone 24 and the shaft 30. It will be understood that in other instances only one or some of these components parts of nozzle 116 may be coated with coating 162. For example, only nose cone 24 may be provided with coating 162 or only sleeve 22 and shaft 30 may have coating 162 applied thereover. In other instances, the interior and/or exterior surfaces that define component parts of the nozzle may be coated with coating 162.

The coating 162 may be comprised of any suitable material that increases one or more of the durability, strength, sealability, impact resistance, and resistance to corrosion of the coated component when it comes into contact with high pressure water during use of nozzle 116 in removing clogs from tubes, for example. Suitable materials for coating 162 include various high strength metals and high-strength non-metals including but not limited to, tungsten carbide, titanium carbide, carbide with cobalt binder, carbide with nickel binder, diamond, silicon diamond, and ceramic such as those ceramic materials previously listed herein. Similarly, in other exemplary embodiments, it may be desirable to coat only parts of the 116 nozzle, such as the nose cone 36, while leaving other surfaces uncoated.

In exemplary embodiments one may fabricate some component parts of the nozzle 16, 116 entirely from one material but other component parts may only have the coating 162 of that same material applied thereover. In other instances, some components parts of the nozzle 16, 116 may be fabricated entirely from one material but other components parts may be fabricated entirely from a different material or may be coated with an entirely different material. It will be understood that the materials selected for each component part of nozzle 16, 116, whether for use in fabricating the entire component part or only coating the component part will be selected to impart desired particular characteristics to that component part. For example, one may mix and match the materials for a particular component part based on wear characteristics and how they may contact the water, or how they are subject to various forces while nozzle 116 is being used.

Figure 17A:
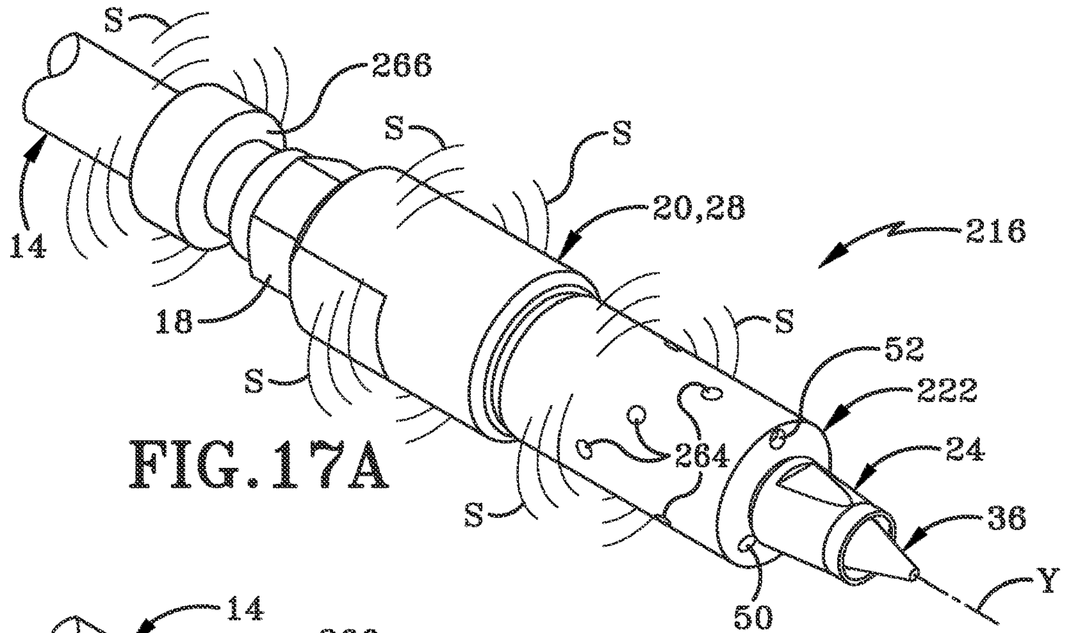
FIG. 17A is a front perspective view of a third embodiment of a nozzle in accordance with an aspect of the present disclosure, showing movement of the nozzle at acute angles relative to the "Y" axis of the nozzle.
Figure 17B:
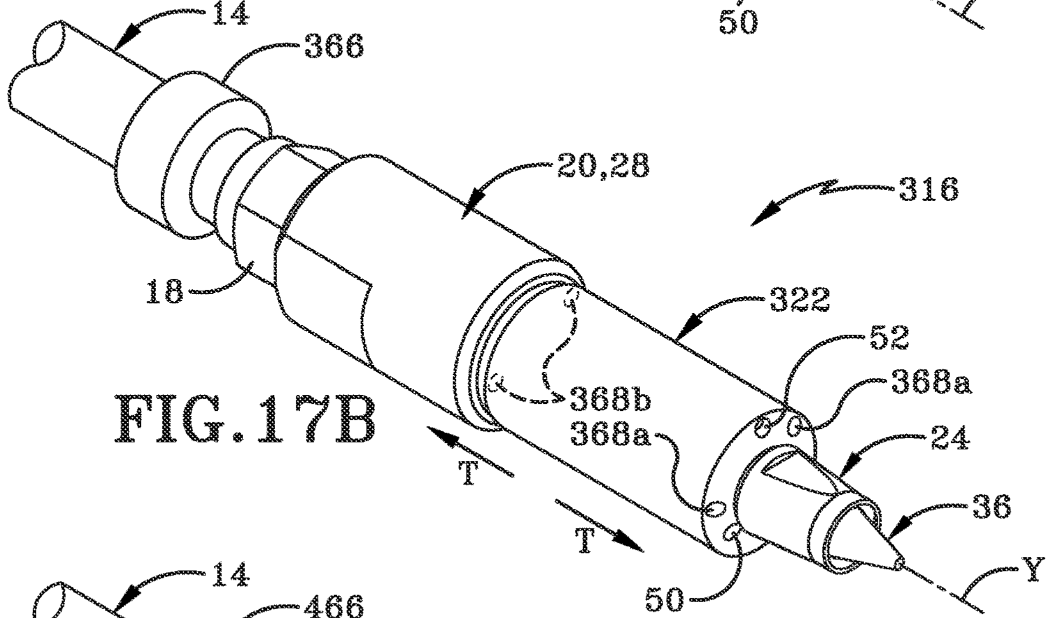
FIG. 17B is a front perspective view of a fourth embodiment of a nozzle in accordance with an aspect of the present disclosure, showing reciprocal movement of the nozzle along the "Y" axis of the nozzle.
Figure 17C:
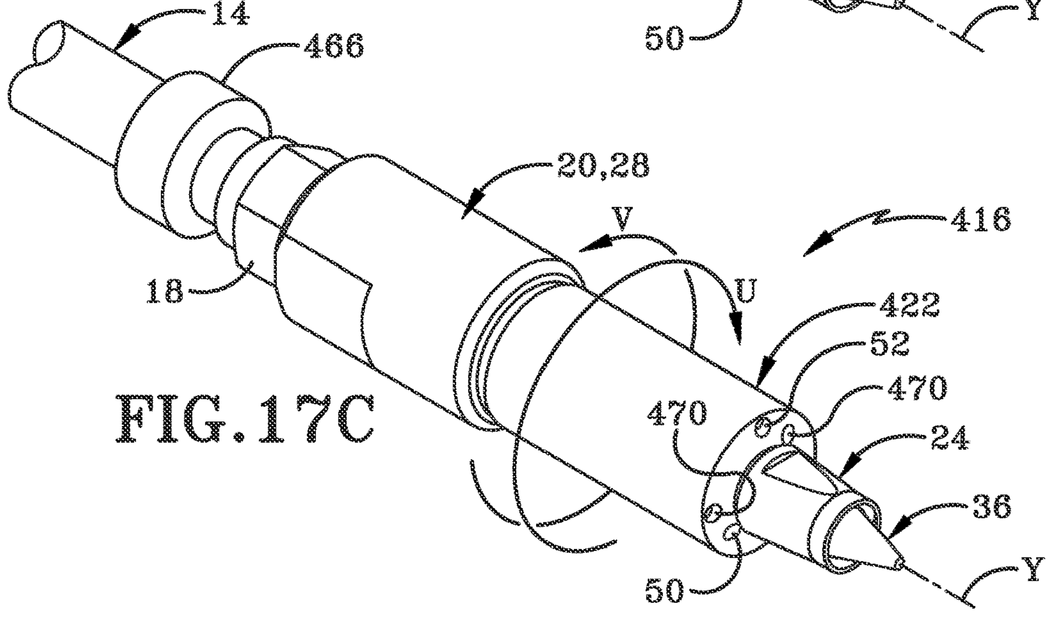
FIG. 17C is a front perspective view of a fifth embodiment of a nozzle in accordance with an aspect of the present disclosure, showing movement of the nozzle's sleeve both in a clockwise direction and a counter-clockwise direction about the "Y" axis of the nozzle.

In nozzle 16, a number of apertures were disclosed as being provided in various locations in order to generate or cause rotational motion of nozzle 16. It should be understood, however, that a greater or lesser number of apertures may be provided in different locations and configurations to effectuate movement of a nozzle in accordance with the present disclosure. FIGS. 17A-17C shown three exemplary embodiments of nozzles in accordance with the present disclosure in which various apertures are provided to effectuate movement of the associated nozzle. In particular, FIGS. 17A, 17B, and 17C show exemplary embodiments that include different aperture configurations that cause different movement profiles of the associated nozzle (as indicated by the arrows in the various figures). The apertures may be located in a variety of different places on the associated nozzle to permit the nozzle to move in a variety of different ways that will help to effectively clean surfaces of tubes, for example. These various movements are in addition to the sleeve rotation described with reference to the first embodiment. The various movements may include one or more of vibration, translation, oscillation, reciprocation, and rotation in more than one direction.

FIG. 17A shows a third embodiment of a nozzle 216 in accordance with an aspect of the present disclosure. The third embodiment of nozzle 216 is substantially identical in structure and function to the nozzle 16 except that the sleeve 222 differs from sleeve 22 in some aspects. In particular, sleeve 222 defines a plurality of apertures 264 that are located and arranged differently from apertures 46 of sleeve 22. Nozzle 216 may also include a valve 266 that is operative to govern and interrupt the flow of the water to nozzle 216 and thereby to apertures 264. During operation of nozzle 216, water flows outwardly through the apertures 264 and due to the reaction force, coupled with an interrupted flow by the valve 266, the nozzle 216 tends to vibrate back and forth as is indicated by the concentric lines "S". The vibrating motion may cause nozzle 216 to wobble back and forth at acute angles relative to the "Y" axis.

FIG. 17B shows a fourth embodiment of a nozzle 316 in accordance with an aspect of the present disclosure. Nozzle 316 is substantially identical in structure and function to nozzle 16 except that sleeve 322 differs from sleeve 22 in some aspects. In particular, sleeve 322 defines end apertures 48, 50, and 52 (which are also found in sleeve 22) but further defines additional end apertures 368*a*. The opposing end of sleeve 322 also defines end apertures 368*b*. Nozzle 316 may also be provided with a valve 366 that is operative to govern and interrupt the flow of the water to nozzle 316 and thereby to sleeve 322. During operation of the nozzle 316, water is passed through the various apertures 48, 50, 52, 368*a*, 368*b* and, due to the reaction force, coupled with an interrupted flow created by the valve 366, water may be intermittently directed towards the first end of the base 28. As a result of water being directed toward the first end of base 28, the sleeve 322 may move longitudinally back and forth relative to base 28 in a reciprocating or oscillating manner. In particular, sleeve 322 may move back and forth parallel to and along the axis "Y" of nozzle 316 toward and away from base 28. This motion of the sleeve 322 is indicated by arrow "T". In other examples, a plurality of apertures similar to apertures 368*b* may be defined in body 20 in addition to or instead of apertures 368*b*. In this instance, substantially the entire nozzle 316 may reciprocate back and forth in the direction indicated by arrow "T" and relative to washing arm 14.

FIG. 17C shows a fifth embodiment of a nozzle 416 in accordance with an aspect of the present disclosure. Nozzle 416 is substantially identical in structure and function to nozzle 16 except that sleeve 422 differs from sleeve 22 in some aspects. In particular, sleeve 422 defines end apertures 48, 50, 52 that are identical to end apertures 48, 50, 52 of sleeve 22. Sleeve 422, however, also defines three-spaced apart apertures 470 that are oriented as mirror images of apertures 48, 50, 52. Nozzle 416 may be configured so that water either flows to apertures 48, 50, 52 or the water flows to apertures 470. When water flows to apertures 48, 50, 52 then sleeve 422 will rotate in a first direction indicated by one of the arrows "V" and "U". When water flows to apertures 470, sleeve 422 will rotate in the opposite direction (represented by the other one of the arrows "V" and "U"). A valve 466 may be provided in operative engagement with nozzle 416 to control and direct water flow to apertures 48, 50, 52 or to apertures 470.

The embodiments shown in FIGS. 17A-17C are merely a few ways to effectuate desired movement in the nozzle. It should be understood that different numbers and locations of apertures in the side wall of the sleeve, different numbers and locations of end apertures in the sleeve, and differently configured apertures and end apertures may be incorporated into the nozzle. The number of location of these various apertures may be selected based on the type of end motion that is desired for the nozzle depending on particular application in which the nozzle will be utilized.

It should be further understood that some embodiments of the nozzle may be capable of performing only one type of movement as described above (e.g., rotating), while other embodiments of nozzle may be capable of performing multiple types of movement. These movements of the nozzle may alternate (e.g., vibration and then rotation) or may occur simultaneously (e.g., vibration and rotation). In additional embodiments, the movements may be substantially constant, may be capable of switching directions (e.g., rotating clockwise and then counterclockwise), may be capable of pulsing, or may be capable of changing speeds (e.g., two or three different speeds or more). All of these various movements may be based on different ways in which water is able to move through the nozzle because of the number and placement of apertures in the nozzle.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While/various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A nozzle for engagement with a washing arm; said nozzle comprising:

a body including:

a base having a first end and a second end and having a longitudinal axis extending therebetween; said second end of the base being adapted to be engaged with an end of a washing arm;

a shaft having a first section that extends longitudinally outwardly from the first end of the base; and a sleeve mounted for rotation about the first section of the shaft;

wherein the base defines a bore that originates in the second end and extends for a distance within the first section of the shaft;

wherein an exterior surface of the first section of the shaft defines at least one opening therein that is in fluid communication with the bore;

wherein the exterior surface of the first section of the shaft defines one or more grooves therein and the at least one opening is in fluid communication with at least one or more grooves; and wherein at least a portion of one or more of the base, the shaft and the sleeve is comprised of a material containing one or more of tungsten carbide, titanium carbide, carbide with a cobalt binder, carbide with a nickel binder, diamond, silicon diamond, and a ceramic material.

2. The nozzle as defined in claim 1, wherein the one or more of the base, the shaft and the sleeve is fabricated entirely from one or more of tungsten carbide, titanium carbide, carbide with a cobalt binder, carbide with a nickel binder, diamond, silicon diamond, and a ceramic material.

3. The nozzle as defined in claim 1, further comprising:

a second section of the shaft that extends outwardly from the first section; and a nose cone that is selectively engageable around the second section of the shaft; and wherein at least a portion of one or more of the nose cone and the second section of the shaft is fabricated from the material.

4. The nozzle as defined in claim 3, wherein the nose cone is fabricated substantially from one or more of tungsten carbide, titanium carbide, carbide with a cobalt binder, carbide with a nickel binder, diamond, silicon diamond, and ceramic.

5. The nozzle as defined in claim 1, wherein the ceramic material is one or more ceramic materials that include alumina, zirconia, beryllia, mullite, cordierite, silicon carbide, quartz, intermetallics, boron, graphite, carbon, silicon, and various other carbides, nitrides, aluminides, or borides, glasses, machinable glasses; oxides of aluminum, magnesium, chromium, silicon, titanium, or zirconium, nitrides of aluminum, magnesium, chromium, silicon, titanium, or zirconium, hydrides of aluminum, magnesium, chromium, silicon, titanium, or zirconium, and other compounds of reactions of the aforementioned metals with a surrounding environment.

6. The nozzle as defined in claim 1, wherein the material is a coating applied over at least a portion of an exterior surface of one or more of the base, the shaft, and the sleeve.

7. The nozzle as defined in claim 6, wherein the coating is a material containing one or more of tungsten carbide, titanium carbide, carbide with a cobalt binder, carbide with a nickel binder, diamond, silicon diamond, and a ceramic material.

8. The nozzle as defined in claim 6, wherein the one or more of the base, the shaft, and the sleeve are fabricated from the different coating materials.

9. The nozzle as defined in claim 6, further comprising:

a second section of the shaft that extends outwardly from the first section; and a nose cone that is selectively engageable around the second section of the shaft; and wherein the coating is applied to at least a portion of the nose cone.

10. A nozzle for engagement with a washing arm; said nozzle comprising:

a body including:

a base having a first end and a second end and having a longitudinal axis extending therebetween; said second end of the base being adapted to be engaged with an end of a washing arm;

a shaft having a first section that extends longitudinally outwardly from the first end of the base; and a sleeve mounted about the first section of the shaft; wherein the sleeve has an outer wall having a first end and a second end; wherein the outer wall defines a bore therein that extends between the first and second ends of the sleeve and the shaft is received through the bore of the sleeve;

wherein at least a portion of one or more of the base, the shaft and the sleeve is is comprised of a material containing one or more of tungsten carbide, titanium carbide, carbide with a cobalt binder, carbide with a nickel binder, diamond, silicon diamond, and a ceramic material;

wherein the base defines a bore that originates in the second end and extends for a distance within the first section of the shaft; and wherein the bore of the base and the bore of the sleeve are in fluid communication;

wherein the outer wall of the sleeve defines at least one aperture that is in fluid communication with the sleeve's bore; and wherein water flowing through the bore of the base flows into the bore of the sleeve and outwardly from the nozzle through the at least one aperture; and wherein the flowing water causes one or both of movement of the sleeve relative to the nozzle and movement of the nozzle relative to the washing arm.

11. The nozzle as defined in claim 10, wherein the at least one aperture includes a first aperture that is defined in the first end of the sleeve; and the first aperture is oriented so as to direct water from the sleeve's bore outwardly beyond an exterior surface of the outer wall; and the at least one aperture is oriented at a first angle relative to the longitudinal axis; and water flowing out of the first aperture causes rotation of the sleeve in a first direction about the longitudinal axis.

12. The nozzle as defined in claim 11, wherein the at least one aperture includes a second aperture that is defined in the first end of the sleeve and is oriented at a second angle relative to the longitudinal axis; wherein the second angle is a mirror image of the first angle; and wherein water flowing out of the second aperture causes rotation of the sleeve about the longitudinal axis in a second direction.

13. The nozzle as defined in claim 12, wherein the at least one aperture is oriented so as to direct water from the sleeve's bore outwardly beyond an exterior surface of the outer wall, and wherein water flowing out of the at least one aperture causes back and forth vibration of the nozzle at an acute angle relative to the longitudinal axis.

14. The nozzle as defined in claim 10, wherein the at least one aperture is defined in the second end of the sleeve and is oriented so as to direct water from the sleeve's bore outwardly beyond an exterior surface of the outer wall of the sleeve, and wherein water flowing out of the at least one aperture is intermittently directed towards the first end of the base and causes the sleeve to reciprocate relative to the shaft; wherein during the reciprocating the sleeve moves back and forth relative to the first end of the base and parallel to the longitudinal axis.

15. The nozzle as defined in claim 10, wherein the at least one aperture includes a first aperture that is defined in the base and the at least one aperture that is in fluid communication with the sleeve's bore; and wherein water flowing through the bore of the base flows into the bore of the sleeve and outwardly from the nozzle through the at least one aperture; and wherein the flowing water causes movement of the nozzle relative to the washing arm.

16. The nozzle as defined in claim 10, wherein the at least one aperture is oriented at an angle relative to the longitudinal axis of the sleeve, and the first end aperture is oriented so as to direct water from the bore of the sleeve outwardly beyond an exterior surface of the outer wall of the sleeve.

17. The nozzle as defined in claim 10, further comprising:

a second section of the shaft that extends outwardly from the first section; and a nose cone that is selectively engageable around the second section of the shaft; and wherein at least a portion of one or more of the nose cone and the second section of the shaft is fabricated from the material.

18. The nozzle as defined in claim 17, wherein the nose cone is free of openings.

19. The nozzle as defined in claim 17, wherein the nose cone is fabricated substantially from one or more of tungsten carbide, titanium carbide, carbide with a cobalt binder, carbide with a nickel binder, diamond, silicon diamond, and ceramic.

20. The nozzle as defined in claim 18, wherein the ceramic material is one or more ceramic materials that include alumina, zirconia, beryllia, mullite, cordierite, silicon carbide, quartz, intermetallics, boron, graphite, carbon, silicon, and various other carbides, nitrides, aluminides, or borides, glasses, machinable glasses; oxides of aluminum, magnesium, chromium, silicon, titanium, or zirconium, nitrides of aluminum, magnesium, chromium, silicon, titanium, or zirconium, hydrides of aluminum, magnesium, chromium, silicon, titanium, or zirconium, and other compounds of reactions of the aforementioned metals with a surrounding environment.

* * * * *